(12) United States Patent
Wozniak

(10) Patent No.: US 10,674,746 B2
(45) Date of Patent: Jun. 9, 2020

(54) ANIMAL NUTRITION COMPOSITIONS AND RELATED METHODS

(71) Applicant: CYTOZYME ANIMAL NUTRITION, INC., Salt Lake City, UT (US)

(72) Inventor: Elizabeth Wozniak, Sandy, UT (US)

(73) Assignee: Cytozyme Animal Nutrition, Inc., Salt Lake City, UT (US)

( * ) Notice: Subject to any disclaimer, the term of this patent is extended or adjusted under 35 U.S.C. 154(b) by 0 days.

(21) Appl. No.: 15/958,817

(22) Filed: Apr. 20, 2018

(65) Prior Publication Data

US 2018/0235257 A1  Aug. 23, 2018

Related U.S. Application Data

(63) Continuation of application No. PCT/US2016/059227, filed on Oct. 27, 2016, and a continuation-in-part of application No. PCT/US2018/015546, filed on Jan. 26, 2018.

(60) Provisional application No. 62/246,938, filed on Oct. 27, 2015, provisional application No. 62/451,543, filed on Jan. 27, 2017.

(51) Int. Cl.
*A23K 10/18* (2016.01)
*A23K 20/22* (2016.01)
*A23K 20/28* (2016.01)
*A23K 30/00* (2016.01)

(52) U.S. Cl.
CPC .............. *A23K 10/18* (2016.05); *A23K 20/22* (2016.05); *A23K 20/28* (2016.05); *A23K 30/00* (2016.05); *A23Y 2220/03* (2013.01)

(58) Field of Classification Search
CPC ......... A23K 10/18; A23K 20/22; A23K 20/28
USPC ........................................................ 426/61
See application file for complete search history.

(56) References Cited

U.S. PATENT DOCUMENTS

| | | | |
|---|---|---|---|
| 4,468,865 A | 9/1984 | Inagaki | |
| 4,888,185 A | 12/1989 | Miller | |
| 5,549,728 A | 8/1996 | Wozniak | |
| 5,767,159 A | 6/1998 | Hultman et al. | |
| 5,817,329 A | 10/1998 | Gardiner | |
| 5,886,027 A | 3/1999 | Khambay et al. | |
| 5,925,378 A | 7/1999 | Carnazzo | |
| 5,968,900 A | 10/1999 | Greenhaff et al. | |
| 5,973,004 A | 10/1999 | Howard | |
| 6,113,974 A | 9/2000 | Winowiski et al. | |
| 6,221,836 B1 | 4/2001 | Beale et al. | |
| 6,224,873 B1 | 5/2001 | Jones | |
| 6,245,378 B1 | 6/2001 | Cavazza | |
| 6,316,499 B1 | 11/2001 | Jones | |
| 6,340,481 B1 | 1/2002 | Jones | |
| 6,340,482 B1 | 1/2002 | Jones | |
| 6,429,198 B1 | 8/2002 | St. Cyr et al. | |
| 6,475,530 B1 | 11/2002 | Kuhrts | |
| 6,479,069 B1 | 11/2002 | Hamilton | |
| 6,506,402 B1 | 1/2003 | Winstrom | |
| 6,525,027 B2 | 2/2003 | Vazquez et al. | |
| 6,602,512 B1 | 8/2003 | Cavazza | |
| 6,620,425 B1 | 9/2003 | Gardiner | |
| 6,682,762 B2 | 1/2004 | Register | |
| 6,767,924 B2 | 7/2004 | Yu et al. | |
| 6,784,209 B1 | 8/2004 | Gardiner et al. | |
| 6,903,136 B2 | 6/2005 | Miller et al. | |
| 6,932,999 B2 | 8/2005 | Cavazza | |
| 7,452,545 B2 | 11/2008 | Yu et al. | |
| 7,597,916 B2 | 10/2009 | Castillo | |
| 7,608,641 B2 | 10/2009 | Miller et al. | |
| 7,645,742 B2 | 1/2010 | Stohs | |
| 7,674,484 B2 | 3/2010 | Romero | |
| 7,749,547 B2 | 7/2010 | Heuer et al. | |
| 7,772,428 B2 | 8/2010 | Heuer et al. | |

(Continued)

FOREIGN PATENT DOCUMENTS

| | | |
|---|---|---|
| CN | 102548568 B | 4/2014 |
| EP | 1 330 957 A1 | 7/2003 |
| EP | 1 207 885 B1 | 9/2005 |
| EP | 2 081 564 B1 | 1/2014 |
| EP | 2 735 340 A1 | 5/2014 |
| EP | 2 875 736 A2 | 5/2015 |
| RU | 2 432 774 C2 | 11/2011 |
| WO | 1984/00668 A1 | 3/1984 |
| WO | 1988/04930 A1 | 7/1988 |
| WO | 1998/04930 A1 | 2/1998 |

(Continued)

OTHER PUBLICATIONS

KR-2015-026464—English Abstract (Year: 2015).*

(Continued)

*Primary Examiner* — Hamid R Badr
(74) *Attorney, Agent, or Firm* — Workman Nydegger

(57) ABSTRACT

Animal nutrition compositions include a carrier and a fermentation product applied to the carrier. Liquid fermentation products are fluidly applied to dry carriers, such as phyllosilicates or other earthen components, while mixing and applying air flow, under appropriate temperature and pH conditions, to bind the fermentation product to the carrier and dry the reaction product to appropriate moisture content. Fermentation products are also mixed with liquid carriers, such as water. Fermentation products include components of a microbial fermentation culture, such as liquid medium, microbial cellular components, and fermentation metabolites produced by microorganisms. Some compositions include a pH buffering agent and/or additional components to further enhance beneficial effects of the composition, such as improved weight gain and feed conversion, reduced gut lesions, harmful gut bacteria count, and decreased mortality. Compositions can be mixed with animal feeds or otherwise administered. Compositions can inhibit fungal growth on animal feeds.

34 Claims, 1 Drawing Sheet

(56) References Cited

U.S. PATENT DOCUMENTS

| | | |
|---|---|---|
| 7,777,074 B2 | 8/2010 | Kramer et al. |
| 7,790,688 B2 | 9/2010 | Wolfe et al. |
| 7,807,716 B2 | 10/2010 | Farber |
| 7,897,192 B2 | 3/2011 | Sherwood et al. |
| 7,939,113 B2 | 5/2011 | Heuer |
| 7,968,125 B2 | 6/2011 | Henderson et al. |
| 7,977,378 B1 | 7/2011 | Villalobos |
| 7,989,007 B2 | 8/2011 | Giuliano et al. |
| 8,003,141 B2 | 8/2011 | Miller et al. |
| 8,013,014 B2 | 9/2011 | Powers et al. |
| 8,048,413 B2 | 11/2011 | Huguet et al. |
| 8,168,241 B2 | 5/2012 | Hastings et al. |
| 8,207,109 B2 | 6/2012 | Gaetani |
| 8,211,628 B2 | 7/2012 | Thatte et al. |
| 8,247,440 B2 | 8/2012 | Phillips |
| 8,252,309 B2 | 8/2012 | Gaetani |
| 8,283,327 B2 | 10/2012 | Kneller |
| 8,354,450 B2 | 1/2013 | Miller et al. |
| 8,435,963 B2 | 5/2013 | Owoc |
| 8,496,979 B1 | 7/2013 | Hastings |
| 8,557,999 B2 | 10/2013 | Puthiaparampil et al. |
| 8,563,053 B2 | 10/2013 | Mousa et al. |
| 8,642,095 B2 | 2/2014 | Sommerfeld et al. |
| 8,691,295 B2 | 4/2014 | Richards et al. |
| 8,703,209 B2 | 4/2014 | McCleary |
| 8,747,906 B2 | 6/2014 | Pietro |
| 8,759,402 B2 | 6/2014 | Gottlieb et al. |
| 8,968,791 B2 | 3/2015 | Moore et al. |
| 8,975,236 B2 | 3/2015 | Stohs et al. |
| 8,975,282 B2 | 3/2015 | Xi et al. |
| 8,993,599 B2 | 3/2015 | Hall et al. |
| 9,012,471 B2 | 4/2015 | Harris et al. |
| 9,044,424 B2 | 6/2015 | Bachovchin et al. |
| 9,096,836 B2 | 8/2015 | Wood et al. |
| 2003/0099739 A1 | 5/2003 | Clark et al. |
| 2004/0005311 A1 | 1/2004 | Pitman |
| 2004/0022860 A1 | 2/2004 | Johson et al. |
| 2006/0257373 A1 | 11/2006 | Tzeng |
| 2006/0276333 A1* | 12/2006 | Sohling ............. B01J 20/12 502/407 |
| 2007/0015686 A1 | 1/2007 | Heuer et al. |
| 2007/0140945 A1* | 6/2007 | Copenhafer ............. C01D 7/12 423/421 |
| 2008/0038228 A1 | 2/2008 | Rautonen et al. |
| 2008/0193531 A1 | 8/2008 | Hermelin et al. |
| 2009/0297640 A1 | 12/2009 | Gardiner et al. |
| 2010/0178300 A1 | 7/2010 | Yiannikouris et al. |
| 2010/0298437 A1 | 11/2010 | Moinard et al. |
| 2011/0142766 A1 | 6/2011 | Rafanelli |
| 2011/0142991 A1 | 6/2011 | Binder et al. |
| 2011/0144393 A1 | 6/2011 | Simpson et al. |
| 2011/0189147 A1 | 8/2011 | Garner et al. |
| 2012/0045426 A1 | 2/2012 | St. Cyr et al. |
| 2012/0141448 A1 | 6/2012 | De Ferra et al. |
| 2012/0177623 A1 | 7/2012 | Naghavi et al. |
| 2012/0178672 A1 | 7/2012 | Wolfe et al. |
| 2012/0183521 A1 | 7/2012 | Sinatra et al. |
| 2013/0011886 A1 | 1/2013 | Tolan et al. |
| 2013/0018102 A1 | 1/2013 | Dente, III et al. |
| 2013/0052278 A1 | 2/2013 | Rich et al. |
| 2013/0210780 A1 | 8/2013 | Jourdan et al. |
| 2014/0037604 A1 | 2/2014 | Greenberg et al. |
| 2014/0105875 A1 | 4/2014 | Bolster et al. |
| 2014/0186472 A1 | 7/2014 | Sherman |
| 2014/0205710 A1 | 7/2014 | Janow |
| 2014/0234449 A1 | 8/2014 | Nielsen et al. |
| 2014/0255524 A1 | 9/2014 | Quintana |
| 2014/0271594 A1 | 9/2014 | Sinatra et al. |
| 2014/0343147 A1 | 11/2014 | Dente, III et al. |
| 2014/0357568 A1 | 12/2014 | Clarke et al. |
| 2015/0017203 A1 | 1/2015 | Morio-Liondore et al. |
| 2015/0105462 A1 | 4/2015 | Singer et al. |
| 2015/0132280 A1 | 5/2015 | Lopez et al. |
| 2015/0133394 A1 | 5/2015 | Mograbi |
| 2015/0150285 A1 | 6/2015 | Mann et al. |
| 2015/0196579 A1 | 7/2015 | Ferrante et al. |

FOREIGN PATENT DOCUMENTS

| | | |
|---|---|---|
| WO | 2007/086846 A1 | 8/2007 |
| WO | 2009/147229 A1 | 12/2009 |
| WO | 2010/054470 A1 | 5/2010 |
| WO | 2010/112861 A1 | 10/2010 |
| WO | 2013/175386 A1 | 11/2013 |
| WO | 2014/028122 A1 | 2/2014 |
| WO | 2014/106083 A1 | 3/2014 |
| WO | 2014/055905 A1 | 4/2014 |
| WO | 2014/056007 A1 | 4/2014 |
| WO | 2014/099904 A1 | 6/2014 |
| WO | 2014/176222 A1 | 10/2014 |
| WO | 2015/027565 A1 | 3/2015 |
| WO | 2015/061860 A1 | 5/2015 |
| WO | 2015/071534 A1 | 5/2015 |

OTHER PUBLICATIONS

International Search Report and Written Opinion dated Jan. 3, 2017, issued in PCT Application No. PCT/US2016/059227, filed Oct. 27, 2016.

* cited by examiner

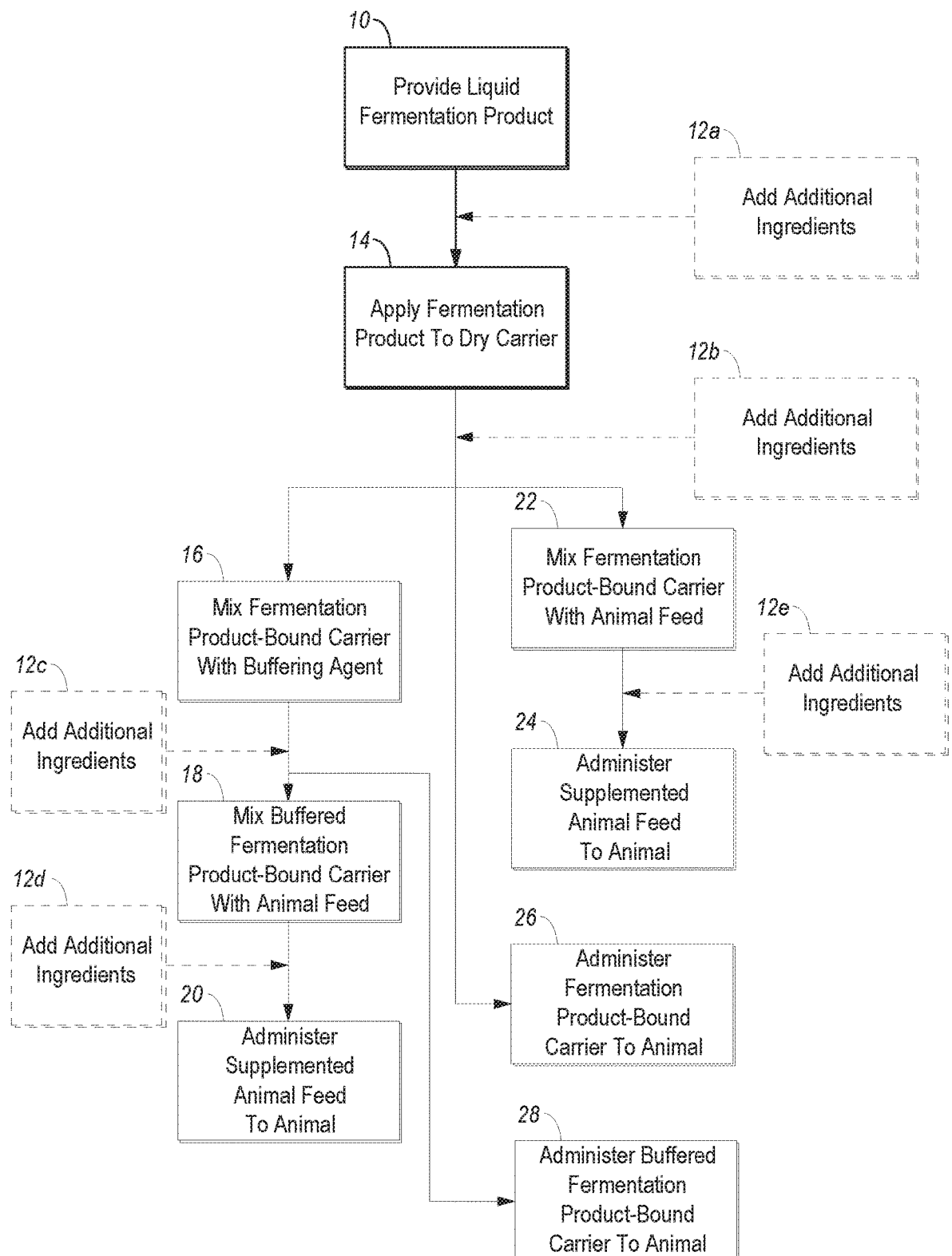

ANIMAL NUTRITION COMPOSITIONS AND RELATED METHODS

CROSS-REFERENCE TO RELATED APPLICATIONS

The present application is a continuation-in-part of International PCT Application No. PCT/US2016/059227 filed Oct. 27, 2016, entitled "ANIMAL NUTRITION COMPOSITIONS AND RELATED METHODS," which claims the benefit of and priority to U.S. Provisional Patent Application No. 62/246,938 filed Oct. 27, 2015, entitled "ANIMAL FEED ADDITIVES AND METHODS. The present application is also a continuation-in-part of International PCT Application No. PCT/US2018/015546 filed Jan. 26, 2018, entitled "ANIMAL NUTRITION COMPOSITIONS AND RELATED METHODS," which claims the benefit of and priority to U.S. Provisional Patent Application No. 62/451,543 filed Jan. 27, 2017, entitled "ANIMAL NUTRITION COMPOSITIONS AND RELATED METHODS. The entirety of each of the foregoing is incorporated herein by reference.

BACKGROUND

1. Technical Field

The present disclosure relates to animal nutritional supplementation, and more particularly to various animal nutrition compositions and to methods of manufacturing and using the same.

2. Related Technology

Recent trends in animal nutrition, health, and well-being have focused on sustainable, organic, non-genetically modified (non-GM) alternatives for animal feeds and feed supplements. Such "all-natural" feeding programs may be beneficial to the long-term health and well-being of the animals. However, the removal of antibiotics and (synthetic) chemicals may lead to disease and increased mortality of the animals in some cases. For instance, feeds that do not include preservative, organic feeds that include material from plants that were not treated with pesticides, and/or feeds that include products from animals that were not treated with antibiotics or synthetic chemicals may carry or be contaminated with microbes, including pathogens, or other disease-causing agents that can be harmful to the animals and to consumers of animal by-products.

A variety of naturally-occurring and other feed additives have been used to improve the health and well-being of the animals. For instance, probiotics (or direct-fed microbials (DFM) as termed by the U.S. Food and Drug Administration (FDA), have grown in popularity in response to research surrounding the balance between beneficial and potentially pathogenic microorganisms in the digestive system. The research determined that the coexistence of beneficial and potentially pathogenic gut flora (e.g., bacteria) is an important factor in the general health of an animal. If this balance is upset, the number of beneficial bacteria could decline while the number of potentially pathogenic bacteria could increase, compromising the animal's health and growth potential. Thus, feeding DFMs containing live, beneficial bacteria can help to maintain proper balance, which may help optimize animal health and growth performance.

Buffering agents have also been used to improve the health and well-being of the animals. For instance, moderating the highly acidic environment of the gut can reduce (premature) acidic degradation of beneficial nutrients, compounds, etc. that may be included in feed or supplements. Accordingly, a larger portion of these beneficial nutrients, compounds, etc. can be available for absorption and nutritional support. Moreover, live, beneficial bacteria administered in the form of probiotics may not survive or grow in harsh, acidic environments, like the animal gut. Thus, buffering agents often seek to increase gastric pH levels to facilitate probiotic survival and increase food conversion ratios. However, some buffers or feeds with high buffer capacity have been shown to increase mortality rates and cause other harmful effects in animal. Low gastric pH in the stomach is known to control the bacterial populations, especially pathogenic bacteria such as *Salmonella* and *E. coli*. Thus, diminishing the acid level (i.e., raising the pH) in the gut can also be harmful to the animals.

Without being bound to any theory, fungal contamination and growth on animal feed products is also an issue in the current state of the art. For instance, fungal contamination of feed ingredients and finished feed products, including feed additives, reduces the feed value of the products and leads to economic loss for individual producers and the industry as a whole. In addition, fungal contamination creates a risk to the health and reduces performance in animals that consume contaminated products. Accordingly, humans who consume such animals or products produced therefrom may be effected thereby, such as with decreased nutritional value.

Accordingly, there are a number of disadvantages in the field of animal feed that can be addressed. In one aspect, for instance, what is needed are sustainable, organic, non-GM animal feed products and methods that enhances certain animal health indicators and/or support animal well-being. In another aspect, animal feed products and methods with enhanced antifungal or fungal growth-inhibiting activity are needed.

BRIEF SUMMARY

Embodiments of the present disclosure solve one or more of the foregoing or other problems in the art with nutritional products and methods of manufacturing and/or using the same (e.g., to enhance the health of an animal). Specifically, embodiments of the present disclosure include animal nutrition compositions, such as animal feed additives or supplements, and methods of manufacturing and/or using the same (e.g., to enhance the health of an animal). Some embodiments relate to a composition that includes an animal feed mixed with an animal feed additive or supplement composition, and to methods of manufacturing and/or using the same (e.g., to enhance the health of an animal). The animal feed additive (or feed supplement) composition can include a carrier and a fermentation product bound to the carrier. The composition can also include a buffering agent mixed with the fermentation product-bound carrier. In some embodiments, the composition can include one or more additional ingredients. The animal feed (or feed component) can comprise any suitable animal ingestible material, whether solid, liquid or other (e.g., mixture).

An exemplary embodiment includes a composition (e.g., an animal nutrition composition) comprising (i) a carrier, and (ii) a fermentation product applied or bound to or mixed with the carrier.

In some embodiments, the composition, carrier, and/or fermentation product can be in a substantially dry and/or solid form. The composition can have a moisture content between about 0.25% and about 20%. The composition can have an average particle size between about 20-297 µm. In some embodiments, the composition, carrier, and/or fermentation product can be in a fluid and/or liquid form. For instance, the composition can comprise a solution, colloid, suspension, or other fluid and/or liquid mixture.

The carrier preferably comprising a naturally-occurring earth component. The earth component can comprise one or more phyllosilicates. Preferably, the one or more phyllosilicates are of the 1:1 or 2:1 clay mineral variety. Preferably, the one or more phyllosilicates are selected from the group consisting of aliettite, attapulgite, bentonite, chlorite, dickite, halloysite, hectorite, illite, kaolinite, montmorillonite, nacrite, nontronite, palygorskite, saponite, sauconite, sepiolite, serpentine, talc, and vermiculite. The earth component can be in a substantially dry form and/or solid state. The earth component preferably has an average particle size between about 20-297 µm. The earth component preferably has a moisture content between about 0.25% and about 20% by weight.

The carrier can alternatively comprise or be a fluid and/or liquid, or in a fluid and/or liquid form. The carrier can comprise water. The carrier can comprise liquid feed. The carrier can comprise a medicament.

The fermentation product preferably comprises one or more anaerobic metabolite products or metabolites. The metabolites or metabolite products preferably having been produced by said one or more microorganisms. The fermentation product preferably comprising cellular material of the one or more microorganisms. The cellular material can comprise cellular components of lysed microorganisms. The cellular material can comprise cellular structural components of or produced by the one or more microorganisms. The cellular structural components can include cell wall, or fragments thereof, of or produced by the one or more microorganisms. The cellular structural components can include organelle or fragments thereof, of or produced by the one or more microorganisms. The cellular material can comprise genetic material of or produced by the one or more microorganisms. The cellular material can comprise macromolecules of or produced by the one or more microorganisms.

Preferably the one or more microorganisms comprise prokaryotic bacteria. The prokaryotic bacteria can be of *Lactobacillus acidophilus*. The one or more microorganisms can include one or more microorganisms other than *Lactobacillus acidophilus*. The one or more microorganisms can include *Lactobacillus acidophilus* and one or more additional microbial (e.g., bacterial) species and/or strains. Alternatively, or in addition, the cellular material can comprise cellular components of one or more yeast, fungus, and/or algae species or strains.

Embodiments can comprise one or more additional components. Embodiments can comprise a mixture of additional components. The one or more additional components can comprise (residual) supplement components. The one or more additional components can be selected, independently, from the group consisting of one or more vitamins, minerals, trace minerals, amino acids, health supplements, pharmaceuticals, plant extracts (e.g., seaweed extracts), phytonutrients, carotenoids, enzymes, probiotics, lignosulfonates, and organic acids (e.g., humic acids). Each of the foregoing ingredients can be added alone or in combination with one or more other of the additional components without limitation. The one or more vitamins can be bound or chelated to at least one of the metabolites, preferably such that the bioavailability of the at least one of the metabolites is increased thereby. one or more minerals can be bound or chelated to at least one of the metabolites, preferably such that the bioavailability of the at least one of the metabolites is increased thereby.

Some embodiments can be substantially and/or entirely devoid of probiotic. Some embodiments can be substantially and/or entirely devoid of living microorganism of one or more variety. Some embodiments can be substantially and/or entirely devoid of probiotic and living microorganism of one or more variety.

Embodiments can also comprise a buffering agent mixed with the fermentation product-bound carrier. The buffering agent is preferably mixed with the fermentation product-bound carrier at a ratio between about 1:1 and about 1:20, fermentation product-bound carrier to buffering agent, or vice versa. The buffering agent can comprise one or more granular or powdered electrolytic substances. The buffering agent can preferably be selected from the group consisting of sodium sesquicarbonate, sodium carbonate, and sodium bicarbonate. The buffering agent can comprise sodium sesquicarbonate. The buffering agent can comprise (a mixture of) sodium carbonate and sodium bicarbonate.

In some embodiments, the composition and/or fermentation product can comprise one or more components of a growth medium in which the one or more microorganisms were grown. The composition and/or fermentation product can comprise one or more components of a growth medium in which the one or more anaerobic metabolites were produced (e.g., by the one or more microorganisms). In some embodiments, the composition and/or fermentation product can comprise one or more aerobic metabolites produced by the one or more microorganisms.

At least one embodiment comprises a nutrient enhanced animal feed product, comprising an animal feed component and a feed additive composition mixed with the feed component. The feed additive composition can be the above-described composition. The feed additive composition can comprise an (earthen) carrier and a fermentation product derived from one or more microorganisms, the fermentation product being bound to the carrier. The nutrient enhanced animal feed product, feed additive composition, and/or the feed component can have a moisture content between about 0.25% and about 20% by weight. The feed additive composition can be mixed with the feed component at a ratio of approximately 0.05-50 kg of the feed additive composition per metric ton (or tonne) of the feed component.

Some embodiments include a method of manufacturing an animal feed supplement. The method can include applying a fermentation product to a carrier to form a combination product. In some embodiments, the fermentation product can bind to the carrier forming a fermentation product-bound carrier. The method can also include mixing the combination product with a buffering agent to form a buffered combination product. In some embodiments, the method can include mixing one or more additional ingredients with the fermentation product, the combination product, and/or the buffered combination product. Some embodiments include a method of manufacturing a supplemented animal feed product. The method can include mixing an animal feed supplement with an animal feed component. Certain embodiments can also include packaging the combination product, buffered combination product, and/or supplemented animal feed product, such as in a sealed and/or air-tight container.

An exemplary embodiment can comprise a method of manufacturing a composition, comprising (i) providing a fermentation product and a carrier, as described above, and (ii) forming a combination product by applying the fermentation product to the carrier, preferably at a ratio of approximately 1:1 by weight, more preferably such that the fermentation product binds to the carrier. The fermentation product preferably comprises a liquid suspension medium having cellular material of one or more (single-celled) microorganisms and/or one or more anaerobic and/or optional aerobic metabolites of or produced by the one or more microorganisms disposed therein. In some embodiments, applying the fermentation product to the carrier comprises fluidly applying the fermentation product in a substantially liquid (suspension) form to the carrier in a substantially dry, solid form, preferably at a ratio of approximately 1:1 by weight.

Certain embodiments can further comprise one or more steps selected from the group consisting of (i) mixing the carrier, preferably at a speed between about 10-200 rpm, while applying the fermentation product, (ii) applying a flow of air to the combination product or fermentation product-bound carrier, preferably over a period of time between about 12-120 hours and/or until the combination product has a moisture content between about 0.25% and about 20% by weight, (iii) mixing the combination product or fermentation product-bound carrier, preferably at a speed between about 10-200 rpm, while applying the flow of air, (iv) maintaining the combination product or fermentation product-bound carrier at a temperature below about 60° C., more preferably below about 55° C., still more preferably below about 50° C., still more preferably below about 45° C., still more preferably below about 40° C., still more preferably below about 38° C., and (v) maintaining the combination product or fermentation product-bound carrier at a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5.

In some embodiments, at least a portion of the fermentation product physically and/or chemically reacts with and/or binds to the carrier, preferably by adsorption to a surface of the carrier and/or absorption below the surface of the carrier. Embodiments can further comprises mixing the combination product with a buffering agent, as described above, preferably at a ratio between about 1:1 and about 1:20, fermentation product-bound carrier to buffering agent, or vice versa, to form a buffered combination product, the buffered combination product preferably having a moisture content between about 0.25% and about 20% by weight and/or having one or more properties described above. Some embodiments comprise mixing one or more additional ingredients or supplement components with one or more of the fermentation product, fermentation product-bound carrier, combination product, and/or buffered combination product. The one or more additional supplement components can be selected, independently, from the group consisting, independently, of vitamin(s), mineral(s) or trace mineral(s), amino acid(s), health supplement(s), pharmaceutical(s), nutraceutical(s), plant(s) or plant part(s), plant product(s) or extract(s), herb(s), phytonutrient(s), carotenoid(s), enzyme(s), probiotic(s), lignosulfonate(s), and organic acid(s). Certain embodiments can be substantially and/or entirely devoid of probiotic and/or living microorganism of one or more variety.

Some embodiments include packaging the combination product, fermentation product-bound carrier, and/or buffered combination product, preferably so as to inhibit substantial absorption or loss of moisture by the packaged combination product.

An exemplary method of manufacturing a composition comprises (i) fluidly applying a substantially liquid fermentation product to a substantially solid earthen carrier, preferably at a ratio of approximately 1:1 by weight, such that the fermentation product binds to the carrier, preferably by adsorption to a surface of the carrier and/or absorption below the surface of the carrier, the carrier preferably comprising one or more phyllosilicate materials, preferably of 1:1 or 2:1 clay mineral variety, the fermentation product preferably comprising a mixture of (i) one or more non-living and/or non-viable microorganisms, (ii) anaerobic and/or aerobic metabolites produced by said one or more microorganisms, and (iii) a liquid suspension medium in which the metabolites were produced by said one or more microorganisms, (ii) mixing the carrier, preferably at a speed between about 10-200 rpm, while applying the fermentation product, (iii) applying a flow of air to the fermentation product-bound carrier, preferably over a period of time between about 12-120 hours and/or until the combination product a moisture content between about 0.25% and about 20%, (iv) mixing the fermentation product-bound carrier, preferably at a speed between about 10-200 rpm, while applying the flow of air, (v) maintaining the fermentation product-bound carrier at a temperature below about 60° C., more preferably below about 55° C., still more preferably below about 50° C., still more preferably below about 45° C., still more preferably below about 40° C., still more preferably below about 38° C., (vi) maintaining the fermentation product-bound carrier at a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, and (vii) mixing the fermentation product-bound carrier with a buffering agent to form a buffered combination product, the buffered combination product preferably having a moisture content between about 0.25% and about 20% by weight, the buffering agent comprising one or more granular or powdered electrolytic substances, preferably selected from the group consisting of sodium sesquicarbonate, sodium carbonate, and sodium bicarbonate. The method can further comprise packaging the composition, preferably so as to inhibit substantial absorption or loss of moisture.

At least one embodiment includes a method of producing a nutrient enhanced animal feed product, the method comprising providing an animal feed component and mixing the animal feed component with the feed additive composition, as described above. The method can include forming the feed additive composition, as described above, and/or mixing the feed component with the feed additive composition at a ratio of approximately 0.05-50 kg of the feed additive composition per metric ton of the feed component. The nutrient enhanced animal feed product, feed component, and/or feed additive composition can be in a substantially solid state, preferably having a moisture content between about 0.25% and about 20% by weight. Embodiments can also include packaging the nutrient enhanced animal feed product, preferably so as to inhibit substantial absorption or loss of moisture.

An exemplary method of producing a nutrient enhanced animal feed product comprises combining a substantially liquid fermentation product with a substantially dry and/or solid earthen carrier such that the fermentation product binds to the carrier, preferably by adsorption to a surface of the carrier and/or absorption below the surface of the carrier, the carrier preferably having an average particle size between about 20-297 μm and/or a moisture content between about 0.25% and about 20%, the carrier preferably comprising one or more phyllosilicate materials, preferably of 1:1 or 2:1 clay mineral variety, the fermentation product preferably comprising a mixture of (i) one or more non-living and/or non-viable microorganisms, (ii) anaerobic and optionally aerobic metabolites produced by said one or more microorganisms, and (iii) a liquid suspension medium in which the metabolites were produced by said one or more microorganisms. In some embodiments, the combining step is as described above.

The method can further comprise optionally mixing the fermentation product-bound carrier with a buffering agent, preferably at a ratio of between about 1:1 to about 1:20, fermentation product-bound carrier to buffering agent, to form a buffered combination product, the buffering agent comprises one or more granular or powdered electrolytic substances, preferably selected from the group consisting of sodium sesquicarbonate, sodium carbonate, and sodium bicarbonate, optionally mixing one or more additional supplement components with one or more of the fermentation product, the fermentation product-bound carrier, and the buffered combination product, the one or more additional supplement components selected from the group consisting of vitamins, minerals, trace minerals, amino acids, health supplements, pharmaceuticals, plant extracts (e.g., seaweed extract), phytonutrients, carotenoids, enzymes, probiotics, lignosulfonates, and organic acids (e.g., humic acids), and mixing an animal feed component with one or more of the fermentation product-bound carrier, preferably at a ratio of approximately 0.05-50 kg of the fermentation product-bound carrier per metric ton of the feed component and the buffered combination product, preferably at a ratio of approximately 0.05-50 kg of the buffered combination product per metric ton of the feed component.

Additional embodiments include a method of enhancing the health of an animal. The method can include administering an effective amount of an animal feed supplement composition to the animal so as to improve one or more health indicators of the animal or animal population (e.g., as compared to a control). The one or more health indicators can be selected from the group consisting of gut lesion count and/or size, gut bacteria count, plate count, and/or size, animal weight and/or body mass, feed consumption, feed conversion and/or feed conversion ratio (consumed feed-to-body weight (or body weight gain) ratio or feed/gain ratio), life span and/or mortality, metabolism and/or metabolic rate, digestion, nitrogen retention, milk production (in mammals), milk quality (as measured by milk fat and/or protein content, etc.), overall health and appearance, and so forth. In particular embodiments, the method can comprise enhancing, improving, or increasing body weight or weight gain, reducing feed consumption and/or improving feed conversion ratios (especially under biotic and abiotic stress conditions), reducing mortality (and/or mortality rates in a population), reducing incidence and/or size of gut lesions, reducing counts, plate counts, size, and/or other incidents of bacteria (e.g., *E. coli, Salmonella*, etc.), improving nitrogen retention, increasing milk production in mammals, improving milk quality (increased fat and/or protein content, etc.) in mammals, improving metabolizable energy levels, improving digestion, improving overall health and appearance, and so forth.

An exemplary method of enhancing the health of an animal comprises administering an effective amount of an animal feed additive composition to the animal so as to improve one or more health indicators of the animal or animal population. The composition and one or more health indicators can be as described above. The step of administering can comprise feeding the feed additive composition to the animal such that the animal ingests the effective amount of the animal feed additive composition. For instance, the administering step can comprise mixing the feed additive composition with an animal feed component, preferably at a ratio of approximately 0.05-50 kg of the composition per metric ton of the feed component and feeding the animal with the mixture of the feed additive composition and feed component such that the animal ingests the effective amount of the animal feed additive composition.

In some embodiments, the animal comprises a broiler chicken. The feed component can comprise one or more chicken feeds selected from the group consisting of a starter feed, a grower feed, and a finishing feed. The chicken can be subjected to biotic or abiotic stress conditions. The method can include reducing gut lesion formation in the animal by a statistically significant amount, preferably by at least (or a minimum of) 5%, 10%, 15%, 20%, 25%, 30%, 35%, 40%, 45%, or 50% as compared to a control. The method can include reducing gut bacteria (e.g., gut *E. coli* or *Salmonella*) count in the animal by a statistically significant amount, preferably by at least (or a minimum of) 5%, 10%, 15%, 20%, 25%, 30%, 35%, 40%, 45%, or 50%, as compared to a control. The method can include increasing body weight of the animal by a statistically significant amount, preferably by at least (or a minimum of) 0.75%, 1%, 1.25%, 1.5%, or 2%, as compared to a control. The method can include decreasing feed conversion (or consumed feed-to-body weight) ratio or mortality-adjusted feed conversion ratio in the animal by a statistically significant amount, preferably by at least (or a minimum of) 3.5%, 3.75%, 4%, 5%, 6%, 7%, 8%, 9%, 10%, 15%, or 20%, as compared to a control. The method can include increasing life span (or decreasing mortality) of the animal by a statistically significant amount, preferably by at least (or a minimum of) 5%, 10%, 15%, 20%, 25%, 30%, 35%, 40%, 45%, or 50%, as compared to a control.

Some embodiments of the present disclosure have enhanced, surprising, and/or unexpected antifungal and/or fungal growth-inhibiting activity or effects. For instance, in certain embodiments, the microbial fermentation product-bound carrier (with or without the buffering agent) resists, inhibits, and/or reduces fungal growth on animal feed components with which it is mixed or combined. Accordingly, some embodiments include an antifungal or fungal growth-inhibiting composition (e.g., feed additive composition having antifungal and/or fungal growth-inhibiting properties). The antifungal or fungal growth-inhibiting composition can comprise a microbial fermentation product-bound carrier (with or without the buffering agent), as described herein. The antifungal or fungus-resistant composition can include or be added to an animal feed component or product. The antifungal or fungal growth-inhibiting composition can reduce the growth of fungus on the animal feed component or product.

Some embodiments can include a method of reducing or inhibiting fungal growth on animal feed or animal feed products. The method can comprise combining a microbial fermentation product-bound carrier (with or without the buffering agent) to the animal feed or animal feed product. The microbial fermentation product-bound carrier (with or without the buffering agent) can reduce or inhibit fungal growth on the animal feed or animal feed product (e.g., by at least, greater than, between, and/or about 5%, 10%, 15%, 20%, 25%, 30%, 35%, 40%, 45%, 50%, 55%, 60%, 65%, 70%, 75%, 80%, 85%, 90%, 95%, 98%, or 99%, for or within a period of time, as compared to a control and/or the animal feed or animal feed product alone (i.e., without the microbial fermentation product-bound carrier mixed therewith)). In at least one embodiment, the microbial fermentation product-bound carrier (with or without the buffering agent) can protect against and/or inhibit (e.g., reduce, decrease, attenuate, prevent, etc.) fungal contamination, infection, and/or growth on the animal feed or animal feed product for or within a period of time. The period of time can be by at least, greater than, between, and/or about 1-52 weeks, or any amount of time or range of time therebetween.

The method can include producing the microbial fermentation product-bound carrier (with or without the buffering agent), such as by applying (e.g., dry-binding) the microbial fermentation product to the carrier and optionally adding the buffering agent thereto. The method can include administering a mixture of the microbial fermentation product-bound carrier (with or without the buffering agent) and the animal feed or animal feed product to an animal. In some embodiments, the method can reduce rates of fungal infection, disease, and/or mortality in animals to which the product is administered, as compared to a control or animal (or population) to which the product is not administered.

Some embodiments can include:

A composition, preferably an antifungal composition, comprising:
  a carrier; and
  a microbial fermentation product bound to the carrier, the fermentation product comprising components of a microbial fermentation culture, including:
    cellular material of one or more microorganisms; and
    one or more anaerobic metabolite products of the one or more microorganisms.

Optionally, wherein the carrier comprises one or more phyllosilicates.

Optionally, wherein the one or more phyllosilicates are of the 1:1 or 2:1 clay mineral variety, preferably selected from the group consisting of aliettite, attapulgite, bentonite, chlorite, dickite, halloysite, hectorite, illite, kaolinite, montmorillonite, nacrite, nontronite, palygorskite, saponite, sauconite, sepiolite, serpentine, talc, and vermiculite.

Optionally, wherein the carrier comprises a substantially dry, solid carrier, the fermentation product being adsorbed to a surface of the carrier and/or absorbed below the surface of the carrier.

Optionally, wherein the carrier comprises a liquid carrier, preferably selected from the group consisting of water, molasses, liquid feed, oil, or liquid medicaments.

Optionally, wherein the fermentation product further comprises one or more components of a suspension culture medium.

Optionally, wherein the fermentation product further comprises one or more aerobic metabolites of the one or more microorganisms.

Optionally, wherein the one or more microorganisms comprise one or more single-celled microorganisms, preferably prokaryotic bacteria.

Optionally, wherein the one or more single-celled microorganisms, preferably prokaryotic bacteria, are of *Lactobacillus acidophilus* and optionally one or more additional microbial species or strain, the one or more additional microbial species or strain preferably comprising one or more additional bacterial species or strain.

Optionally, wherein the one or more microorganisms comprise yeast and/or fungi, the cellular structural components comprising lysed cellular structural components of the yeast and/or fungi, and the one or more anaerobic metabolite products comprising one or more anaerobic metabolite products of the yeast and/or fungi.

Optionally, wherein the fermentation product-bound carrier has an average particle size between about 20-297 μm.

Optionally, wherein the fermentation product-bound carrier has a moisture content between about 0.25% and about 5% by weight.

Optionally, wherein the cellular material comprises cellular structural components of the one or more one or more microorganisms, the cellular structural components preferably comprising cell wall or fragments thereof and/or organelle or fragments thereof.

Optionally, wherein the cellular structural components comprise cellular structural components of lysed microorganisms.

Optionally, wherein less than about 50%, or less than about 40%, or less than about 30%, or less than about 25%, or less than about 20%, or less than about 15%, or less than about 10%, or less than about 5%, or less than about 1%, or less than about 0.5%, or less than about 0.25%, or less than about 0.1%, or less than about 0.05%, or less than about 0.01%, of the one or more microorganisms are living or viable.

Optionally, further comprising one or more additional components selected from the group consisting of vitamins, minerals or trace minerals, amino acids, health supplements, pharmaceuticals, nutraceuticals, plants or plant parts, plant products or extracts, herbs, phytonutrients, carotenoids, enzymes, probiotics, lignosulfonates, and organic acids.

Optionally, wherein one or more of the vitamins and/or minerals are bound or chelated to at least one of the metabolites such that the bioavailability of the at least one of the metabolites is increased thereby.

Optionally, further comprising a buffering agent mixed with the fermentation product-bound carrier.

Optionally, wherein the buffering agent is mixed with the fermentation product bound-carrier at a ratio between about 1:1 and about 1:20, fermentation product-bound carrier to buffering agent, or vice versa.

Optionally, wherein the buffering agent comprises one or more granular or powdered electrolytic substances comprising one or more of sodium sesquicarbonate, sodium carbonate, and sodium bicarbonate.

Optionally, wherein the buffering agent has a moisture content between about 0.25% and about 5% by weight.

Optionally, wherein the composition is mixed with an animal feed component, the feed component comprising solid feed and/or liquid feed, the liquid feed preferably comprising water.

Optionally, wherein the feed component has a moisture content between about 0.25% and about 20% by weight.

Optionally, wherein the composition is mixed with the feed component at a ratio of approximately 0.05-50 kg of the composition per metric ton of the feed component.

Optionally, wherein the feed component comprises a drinking-water.

Optionally, wherein the fermentation product-bound carrier is mixed with the drinking-water at a ratio of approximately 5-5000 milliliters of fermentation product-bound carrier per 1000 liters of drinking-water.

A composition, preferably an antifungal composition, comprising:
 a substantially dry, earthen carrier comprising one or more phyllosilicates; and
 a microbial fermentation product bound to the carrier, the fermentation product being adsorbed to a surface of the carrier and/or absorbed below the surface of the carrier, the fermentation product comprising components of a microbial suspension culture, including:
  one or more components of a suspension culture medium;
  cellular structural components of one or more microorganisms; and
  one or more anaerobic metabolite products of the one or more microorganisms,
 the composition comprising less than about 50% living microorganisms.

Optionally, further comprising a buffering agent mixed with the fermentation product-bound carrier, the buffering agent comprising one or more granular or powdered electrolytic substances selected from the group consisting of sodium sesquicarbonate, sodium carbonate, sodium bicarbonate, and combinations thereof.

Optionally, wherein the composition has a moisture content between about 0.25% and about 20% by weight.

A method of manufacturing a composition, preferably an antifungal composition, comprising applying a microbial fermentation product to a carrier such that the fermentation product binds to the carrier, the fermentation product comprising:
 cellular material of one or more microorganisms, the one or more microorganisms preferably comprising one or more single-celled microorganisms; and
 one or more anaerobic metabolite products of the one or more microorganisms.

Optionally, wherein the carrier comprises one or more phyllosilicates.

Optionally, wherein the one or more phyllosilicates are selected from the group consisting of 1:1 clay mineral phyllosilicates, 2:1 clay mineral phyllosilicates, aliettite, attapulgite, bentonite, chlorite, dickite, halloysite, hectorite, illite, kaolinite, montmorillonite, nacrite, nontronite, palygorskite, saponite, sauconite, sepiolite, serpentine, talc, vermiculite, and combinations thereof.

Optionally, wherein the carrier comprises a substantially dry and/or solid carrier, the fermentation product being adsorbed to a surface of the carrier and/or absorbed below the surface of the carrier.

Optionally, wherein the fermentation product is applied to the carrier at a ratio of approximately 1:1 by weight to approximately 1:20 by weight, fermentation product to carrier, or vice versa.

Optionally, wherein the carrier comprises a liquid carrier, wherein applying the fermentation product to the carrier comprises dissolving, suspending, dispersing, or otherwise disposing the fermentation product in the liquid carrier.

Optionally, wherein the fermentation product further comprises a liquid suspension culture medium, the cellular material and one or more anaerobic metabolite products being disposed in the liquid suspension culture medium, and wherein applying the fermentation product to the carrier comprises fluidly applying the fermentation product to the carrier.

Optionally, wherein the fermentation product further comprises one or more aerobic metabolites of the one or more microorganisms.

Optionally, wherein the fermentation product-bound carrier has an average particle size between about 20-297 μm.

Optionally, wherein the fermentation product-bound carrier has a moisture content between about 0.25% and about 20% by weight.

Optionally, wherein the one or more microorganisms comprise prokaryotic bacteria, the cellular material comprising cellular structural components of the prokaryotic bacteria, the one or more anaerobic metabolite products comprising one or more anaerobic metabolite products of the prokaryotic bacteria.

Optionally, wherein the prokaryotic bacteria are of *Lactobacillus acidophilus* and preferably one or more additional microbial species or strain, the one or more additional microbial species or strain preferably comprising one or more additional bacterial species or strain.

Optionally, wherein the one or more microorganisms comprise yeast and/or fungi, the cellular structural components comprising lysed cellular structural components of the yeast and/or fungi, the one or more anaerobic metabolite products comprising one or more anaerobic metabolite products of the yeast and/or fungi.

Optionally, wherein the cellular material comprises cellular structural components of the one or more microorganisms.

Optionally, wherein the cellular structural components comprise cellular structural components of lysed microorganisms.

Optionally, wherein the fermentation product is applied to the carrier at a ratio of approximately 1:1 by weight.

Optionally, further comprising cultivating a microbial fermentation suspension culture for a first period of time, the microbial fermentation suspension culture comprising a liquid fermentation culture medium and the one or more microorganisms, the one or more microorganisms undergoing anaerobic metabolism or cellular respiration during the first period of time.

Optionally, further comprising killing or inactivating the one or more microorganisms such that less than about 50%, or less than about 40%, or less than about 30%, or less than about 25%, or less than about 20%, or less than about 15%, or less than about 10%, or less than about 5%, or less than about 1%, or less than about 0.5%, or less than about 0.25%, or less than about 0.1%, or less than about 0.05%, or less than about 0.01%, of the one or more microorganisms are living or viable.

Optionally, further comprising one or more steps selected from the group consisting of:
 mixing the carrier while applying the fermentation product thereto;
 applying a flow of air to the carrier while applying the fermentation product thereto and/or after applying the fermentation product thereto, preferably over a period of time between about 12-120 hours and/or until the fermentation product-bound carrier has a moisture content between about 0.25% and about 20% by weight;
 mixing the carrier with the fermentation product applied thereto while applying a flow of air;
 maintaining the carrier with the fermentation product applied thereto at a temperature below about 60° C. for a first period of time; and maintaining the carrier with the fermentation product applied thereto at a pH between about 2-10.

Optionally, wherein applying the fermentation product to the carrier comprises physically or chemically reacting at least a portion of the fermentation product with the carrier.

Optionally, further comprising packaging the fermentation product-bound carrier so as to inhibit substantial absorption or loss of moisture by the packaged fermentation product-bound carrier.

Optionally, further comprising mixing a buffering agent with the fermentation product-bound carrier to form a buffered combination product.

Optionally, wherein the buffering agent is mixed with the fermentation product-bound carrier at a ratio between about 1:1 and about 1:20, fermentation product-bound carrier to buffering agent, or vice versa.

Optionally, wherein the buffering agent comprises one or more granular or powdered electrolytic substances selected from the group consisting of sodium sesquicarbonate, sodium carbonate, and sodium bicarbonate.

Optionally, wherein the buffering agent has a moisture content between about 0.25% and about 5% by weight.

Optionally, further comprising packaging the buffered combination product so as to inhibit substantial absorption or loss of moisture by the packaged buffered combination product.

Optionally, further comprising mixing the buffered combination product with an animal feed component, the feed component comprising solid feed and/or liquid feed, the liquid feed preferably comprising water.

Optionally, wherein the feed component is mixed with the buffered combination product at a ratio of approximately 0.05-50 kg of the buffered combination product per metric ton of the feed component.

Optionally, further comprising packaging the buffered combination product mixed with the feed component so as to inhibit substantial absorption or loss of moisture by the packaged buffered combination product.

Optionally, further comprising mixing the fermentation product-bound carrier with an animal feed component, the feed component comprising solid feed and/or liquid feed, the liquid feed preferably comprising water.

Optionally, wherein the fermentation product-bound carrier is mixed with the feed component at a ratio of approximately 0.05-50 kg of the fermentation product-bound carrier per metric ton of the feed component.

Optionally, further comprising packaging the fermentation product-bound carrier mixed with the feed component so as to inhibit substantial absorption or loss of moisture by the packaged buffered combination product.

Optionally, wherein the feed component has a moisture content between about 1% and about 20% by weight.

Optionally, further comprising mixing one or more additional components with the fermentation product and/or fermentation product-bound carrier, the one or more additional components selected from the group consisting of vitamins, minerals or trace minerals, amino acids, health supplements, pharmaceuticals, nutraceuticals, plants or plant parts, plant products or extracts, herbs, phytonutrients, carotenoids, enzymes, probiotics, lignosulfonates, and organic acids.

Optionally, wherein one or more of the vitamins and/or minerals are bound or chelated to at least one of the metabolites such that the bioavailability of the at least one of the metabolites is increased thereby.

A method of manufacturing any of the described compositions, the method comprising fluidly applying the microbial fermentation product in liquid form to the carrier such that the fermentation product binds to the carrier.

A method of manufacturing a composition, preferably an antifungal composition, comprising:
cultivating a microbial fermentation suspension culture, the culture comprising a liquid fermentation culture medium, one or more microorganisms, and anaerobic metabolites of the one or more microorganisms, the one or more microorganisms preferably comprising one or more single-celled microorganisms;
killing or inactivating the one or more microorganisms in the culture to produce a fermentation product, the fermentation product comprising the liquid fermentation culture medium, the killed or inactivated one or more microorganisms, and the anaerobic metabolites, preferably wherein less than about 50% of the one or more microorganisms are living or viable in the fermentation product; and
fluidly applying the fermentation product to a solid carrier such that the fermentation product binds to the carrier.

A method of manufacturing a composition, preferably an antifungal composition, comprising:
cultivating a microbial fermentation suspension culture for a first period of time, the microbial fermentation suspension culture comprising a liquid fermentation culture medium; one or more microorganisms; and anaerobic metabolites of the one or more microorganisms, the one or more microorganisms preferably comprising one or more single-celled microorganisms;
killing or inactivating the one or more microorganisms in the suspension culture such that less than about 50% of the one or more microorganisms are living or viable, thereby producing a fermentation product, the fermentation product comprising the liquid fermentation culture medium, the killed or inactivated one or more microorganisms, and the anaerobic metabolites; and
fluidly applying the fermentation product to a solid carrier, preferably at a ratio of approximately 1:1 by weight, such that the fermentation product binds to the carrier, preferably by adsorption to a surface of the carrier and/or absorption below the surface of the carrier, the carrier preferably comprising one or more phyllosilicate materials, preferably of 1:1 or 2:1 clay mineral variety.

Optionally, further comprising one or more steps selected from the group consisting of:
mixing the carrier, preferably at a speed between about 10-200 rpm, while applying the fermentation product thereto;
applying a flow of air to the fermentation product-bound carrier, preferably over a period of time between about 12-120 hours and/or until the fermentation product-bound carrier a moisture content between about 0.25% and about 20% by weight;
mixing the fermentation product-bound carrier, preferably at a speed between about 10-200 rpm, while applying the flow of air;
maintaining the fermentation product-bound carrier at a temperature below about 60° C.; and
maintaining the fermentation product-bound carrier at a pH between about 2-10, preferably about 3-8, more preferably between about 3-6, still more preferably between about 4-5.

Optionally, further comprising mixing the fermentation product-bound carrier with a buffering agent to form a buffered combination product, the buffered combination product preferably having a moisture content between about 1% and about 20% by weight, the buffering agent comprising one or more granular or powdered electrolytic substances, preferably selected from the group consisting of sodium sesquicarbonate, sodium carbonate, and sodium bicarbonate.

A method of producing a nutrient enhanced animal feed product, comprising:

combining a substantially liquid fermentation product with a substantially dry and/or solid earthen carrier such that the fermentation product binds to the carrier, preferably by adsorption to a surface of the carrier and/or absorption below the surface of the carrier, the carrier preferably having an average particle size between about 20-297 μm and/or a moisture content between about 1% and about 20% by weight, the carrier preferably comprising one or more phyllosilicate materials, preferably of 1:1 or 2:1 clay mineral variety, the fermentation product preferably comprising a mixture of (i) non-living and/or non-viable microorganisms, the non-living and/or non-viable microorganisms preferably comprising lysed microorganisms, the microorganisms preferably comprising one or more single-celled microorganisms, (ii) anaerobic and optionally aerobic metabolites produced by said microorganisms, and (iii) a liquid suspension medium in which the metabolites were produced by said microorganisms, the fermentation product preferably comprising less than about 50% living and/or viable microorganisms, wherein the combining step comprises:

fluidly applying the fermentation product to the earthen carrier, preferably at a ratio of approximately 1:1 by weight;

mixing the carrier, preferably at a speed between about 10-200 rpm;

applying a flow of air to the carrier, preferably (i) while mixing the carrier, (ii) over a period of time between about 12-120 hours, and/or (iii) until the fermentation product-bound carrier has a moisture content between about 0.25% and about 20% by weight;

maintaining the fermentation product-bound carrier at a temperature below about 60° C., preferably below about 38° C.; and maintaining the fermentation product-bound carrier at a pH between about 2-10, preferably about 3-8, more preferably between about 3-6, still more preferably between about 4-5;

optionally mixing the fermentation product-bound carrier with a buffering agent, preferably at a ratio of between about 1:4 to about 1:8, fermentation product-bound carrier to buffering agent, to form a buffered combination product, the buffering agent comprises one or more granular or powdered electrolytic substances, preferably selected from the group consisting of sodium sesquicarbonate, sodium carbonate, and sodium bicarbonate;

optionally mixing one or more additional supplement components with one or more of the fermentation product, the fermentation product-bound carrier, and the buffered combination product, the one or more additional supplement components selected from the group consisting of vitamins, minerals, trace minerals, amino acids, health supplements, pharmaceuticals, plant extracts, phytonutrients, carotenoids, enzymes, probiotics, lignosulfonates, and organic acids; and mixing an animal feed component with one or more of:
the fermentation product-bound carrier, preferably at a ratio of approximately 0.05-50 kg of the fermentation product-bound carrier per metric ton of the feed component; and
the buffered combination product, preferably at a ratio of approximately 0.05-50 kg of the buffered combination product per metric ton of the feed component, the feed component comprising solid feed and/or liquid feed, the liquid feed preferably comprising water.

A nutrient enhanced animal feed product, comprising:
an animal feed component, the feed component comprising solid feed; and
a feed additive composition mixed with the feed component, the feed additive composition comprising:
an earthen carrier; and
a fermentation product derived from one or more microorganisms, the one or more microorganisms preferably comprising one or more single-celled microorganisms, the fermentation product being bound to the carrier.

A method of enhancing the health of an animal, comprising administering an effective amount of any of the described compositions to an animal so as to improve one or more health indicators of the animal.

A method of supplementing the diet of an animal, comprising administering an effective amount of an animal nutrient composition to the animal, the composition, comprising:
a carrier; and
a fermentation product bound to the carrier.

A method of enhancing the health of an animal, comprising:
administering an effective amount of an animal nutrient composition to the animal so as to improve one or more health indicators of the animal, the composition, comprising:
a carrier; and
a fermentation product derived from one or more microorganisms, the one or more microorganisms preferably comprising one or more single-celled microorganisms, the fermentation product being bound to the carrier,
the one or more health indicators being selected from the group consisting of:
gut lesion formation;
gut bacteria count;
weight gain;
feed conversion ratio; and
life span.

Optionally, wherein the composition is in substantially dry and/or solid state, preferably having a moisture content between about 1% and about 20%.

Optionally, wherein the fermentation product comprises:
one or more metabolites produced by one or more microorganisms; and
cellular material of the one or more microorganisms, the cellular material preferably comprising cellular components of lysed prokaryotic bacteria, preferably of *Lactobacillus acidophilus* and optionally one or more additional microbial species or strain, the one or more additional microbial species or strain preferably comprising one or more additional bacterial species or strain.

Optionally, wherein the fermentation product further comprises components of a growth medium in which the metabolites were produced by the one or more microorganisms.

Optionally, wherein the carrier comprises an earthen carrier, preferably comprising one or more phyllosilicates, preferably of 1:1 or 2:1 clay mineral variety, more preferably selected from the group consisting of aliettite, attapulgite, bentonite, chlorite, dickite, halloysite, hectorite, illite, kaolinite, montmorillonite, nacrite, nontronite, palygorskite, saponite, sauconite, sepiolite, serpentine, talc, and vermiculite, the earthen carrier preferably being in a substantially solid state, more preferably having a particle size between about 20-297 μm.

Optionally, wherein the composition further comprises a mixture of vitamins and minerals, one or more of the vitamins and minerals being preferably bound or chelated to at least one of the cellular metabolites such the bioavailability of at least one of the cellular metabolites is increased thereby.

Optionally, wherein the composition further comprises a buffering agent mixed with the fermentation product-bound carrier, preferably at a ratio of between about 1:4 to about 1:8, fermentation product-bound carrier to buffering agent, the buffering agent preferably comprising one or more granular or powdered electrolytic substances, more preferably selected from the group consisting of sodium sesquicarbonate, sodium carbonate, and sodium bicarbonate.

Optionally, wherein administering an effective amount of the composition to the animal comprises feeding the composition to the animal such that the animal ingests the effective amount of the composition.

Optionally, wherein administering an effective amount of the composition to the animal further comprises:

mixing the composition with an animal feed component, preferably at a ratio of approximately 0.05-50 kg of the composition per metric ton of a solid feed component or approximately 5-5000 milliliters of composition per 1000 liters of a liquid feed component, the liquid feed component preferably comprising drinking-water; and feeding the animal with the mixture of the composition and feed component such that the animal ingests the effective amount of the animal feed additive composition.

Optionally, wherein the mixture of the feed additive composition and feed component is in substantially dry and/or solid state, preferably having a moisture content between about 1% and about 20%.

Optionally, wherein the animal comprises a chicken, preferably a broiler chicken, the feed component comprising one or more chicken feeds selected from the group consisting of a starter feed, a grower feed, and a finishing feed.

Optionally, further comprising reducing gut lesion formation in the animal by a statistically significant amount, preferably by at least 5%, 10%, 15%, 20%, 25%, 30%, 35%, 40%, 45%, or 50%, as compared to a control.

Optionally, further comprising reducing gut bacteria count, preferably gut *E. coli* or *Salmonella* count, in the animal by a statistically significant amount, preferably by at least 5%, 10%, 15%, 20%, 25%, 30%, 35%, 40%, 45%, or 50%, as compared to a control.

Optionally, further comprising increasing body weight of the animal by a statistically significant amount, preferably by at least 0.75%, more preferably by at least 1%, still more preferably by at least 1.25%, still more preferably by at least 1.5%, still more preferably by at least 2%, as compared to a control.

Optionally, further comprising decreasing feed conversion ratio in the animal by a statistically significant amount, preferably by at least 3.5%, more preferably by at least 3.75%, still more preferably by at least 4%, still more preferably by at least 5%, still more preferably by at least 6%, still more preferably by at least 7%, still more preferably by at least 8%, still more preferably by at least 9%, still more preferably by at least 10%, as compared to a control.

Optionally, further comprising increasing life span of the animal by a statistically significant amount, preferably by at least 5%, or by at least 10%, or by at least 15%, or by at least 20%, or by at least 25%, or by at least 30%, or by at least 35%, or by at least 40%, or by at least 45%, or by at least 50%, as compared to a control.

A method of administering a nutrient supplement to an animal, the method comprising:

cultivating a microbial fermentation suspension culture, the culture comprising a liquid fermentation culture medium, one or more microorganisms, and anaerobic metabolites of the one or more microorganisms, the one or more microorganisms preferably comprising one or more single-celled microorganisms;

killing or inactivating the one or more microorganisms in the culture to produce a fermentation product, the fermentation product comprising the liquid fermentation culture medium, the killed or inactivated one or more microorganisms, and the anaerobic metabolites, preferably wherein less than about 50% of the one or more microorganisms are living and/or viable in the fermentation product; and fluidly applying the fermentation product to a carrier; and administering the fermentation product-applied carrier to an animal.

A nutrient enhanced animal feed product, comprising:

an animal feed component, the feed component comprising liquid feed, the liquid feed preferably comprising drinking-water; and a feed additive composition mixed with the feed component, the feed additive composition comprising a fermentation product derived from one or more microorganisms, the one or more microorganisms preferably comprising one or more single-celled microorganisms, the fermentation product being bound to or mixed with the carrier.

A method of inhibiting fungal growth on an animal feed product, comprising:

mixing the animal feed component with an antifungal composition, the antifungal composition comprising:
  a carrier; and
  a microbial fermentation product bound to the carrier, the fermentation product comprising components of a microbial fermentation culture, including:
    cellular material of one or more microorganisms, the one or more microorganisms preferably comprising one or more single-celled microorganisms; and
    one or more anaerobic metabolite products of the one or more microorganisms.

Optionally, wherein the antifungal composition further comprises a buffering agent.

Optionally, wherein the antifungal composition further comprises one or more additional supplement components selected from the group consisting of vitamins, minerals, trace minerals, amino acids, health supplements, pharmaceuticals, plant extracts, phytonutrients, carotenoids, enzymes, probiotics, lignosulfonates, and organic acids.

Optionally, further comprising manufacturing the antifungal composition, wherein manufacturing the antifungal composition comprises combining a substantially liquid microbial fermentation product with a substantially dry and/or solid earthen carrier such that the fermentation product binds to the carrier, preferably by adsorption to a surface of the carrier and/or absorption below the surface of the carrier, the carrier preferably having an average particle size between about 20-297 µm and/or a moisture content between about 1% and about 20% by weight, the carrier preferably comprising one or more phyllosilicate materials, preferably of 1:1 or 2:1 clay mineral variety, the fermentation product preferably comprising a mixture of (i) non-living and/or non-viable microorganisms, the non-living and/or non-viable microorganisms preferably comprising lysed microorganisms, the microorganisms preferably comprising one or more single-celled microorganisms, (ii) anaerobic and optionally aerobic metabolites produced by said microorganisms, and (iii) a liquid suspension medium in which the metabolites were produced by said microorganisms, the fermentation product preferably comprising less than about 50% living and/or viable microorganisms.

Any one of the foregoing, wherein the fermentation product is substantially and/or entirely devoid of probiotic and/or living microorganism of one or more variety.

A composition or method substantially as described in the application.

Some embodiments may include any of the features, options, and/or possibilities set out elsewhere in the present disclosure, including in other aspects or embodiments of the present disclosure. It is also noted that each of the foregoing, following, and/or other features described herein represent a distinct embodiment of the present disclosure. Moreover, combinations of any two or more of such features represent distinct embodiments of the present disclosure. Such features or embodiments can also be combined in any suitable combination and/or order without departing from the scope of this disclosure. Thus, each of the features described herein can be combinable with any one or more other features described herein in any suitable combination and/or order. Accordingly, the present disclosure is not limited to the specific combinations of exemplary embodiments described in detail herein.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the present disclosure can be obtained, a more particular description of the embodiments briefly described above will be rendered by reference to specific embodiments thereof which are illustrated in the appended drawings. For better understanding, the like elements have been designated by like reference numbers throughout the FIGURE(S). Understanding that these drawings depict only typical embodiments of the invention and are not therefore to be considered to be limiting of its scope, the invention will be described and explained with additional specificity and detail through the use of the accompanying drawing(s) in which:

FIG. 1 depicts a diagrammatic flow chart illustrating a method of manufacturing and administering an animal feed supplement according to an embodiment of the present disclosure.

DETAILED DESCRIPTION

Before describing various embodiments of the present disclosure in detail, it is to be understood that this disclosure is not limited to the specific features of the particularly exemplified systems, methods, and/or products described herein that may vary from one embodiment to the next. Thus, while certain embodiments of the present disclosure will be described in detail, with reference to specific features (e.g., components, ingredients, parts, portions, elements, members, combinations, configurations, parameters, properties, steps, etc.), the descriptions are illustrative and are not to be construed as limiting the scope of the present disclosure and/or the claimed invention. It is also to be understood that much, if not all of the terminology used herein is only for the purpose of describing particular embodiments of the present disclosure, and is not necessarily intended to limit the scope of the disclosure in any particular manner.

Unless defined otherwise, all technical and scientific terms used herein have the same meaning as commonly understood by one of ordinary skill in the art to which the present disclosure pertains.

Various aspects of the present disclosure, including systems, methods, and/or products may be illustrated with reference to one or more embodiments or implementations, which are exemplary in nature. As used herein, the terms "embodiment" and "implementation" mean "serving as an example, instance, or illustration," and should not necessarily be construed as preferred or advantageous over other aspects disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the description thereof.

As used throughout this disclosure, the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used in this specification and the appended claims, the singular forms "a," "an" and "the" each contemplate, include, and specifically disclose both the singular and plural referents, unless the context clearly dictates otherwise. For example, reference to a "carrier" contemplates and specifically discloses one, as well as two or more nucleic acids. Similarly, use of a plural referent does not necessarily require a plurality of such referents, but contemplates, includes, and specifically discloses one, as well as two or more of such referents, unless the context clearly dictates otherwise.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise specifically disclosed and contemplated herein. Thus, disclosure of an illustrative measurement (e.g., length, width, thickness, etc.) that is less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various aspects or embodiments of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical, physical, and/or chemical association.

In addition, various aspects or embodiments of the present disclosure can be illustrated by describing components that are mixed together. As used herein, "mixed," "mixing," and similar terms indicate a physical combining or combination of two or more components. In some embodiments, the physical combining or combination results in a (chemical and/or physical) reaction. Such chemical reactions can be evidenced by a change in the chemical composition, pH, or other indicator relative to the components prior to being mixed (or as expected after being mixed absent the reaction). Thus, mixing and/or mixed components can include reacting and/or reacted components in certain embodiments. Accordingly, reference to mixing or mixed components includes a reference to reacting or reacted components.

To facilitate understanding, like reference numerals have been used, where possible, to designate like elements common to the FIGURES. Specifically, in the exemplary embodiments illustrated in the FIGURES, like structures will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

While the detailed description is separated into sections, the section headers and contents within each section are for organizational purposes only and are not intended to be self-contained descriptions and embodiments or to limit the scope of the description or the claims. Rather, the contents of each section within the detailed description are intended to be read and understood as a collective whole, where elements of one section may pertain to and/or inform other sections. Accordingly, embodiments specifically disclosed within one section may also relate to and/or serve as additional and/or alternative embodiments in another section having the same and/or similar products, methods, and/or terminology.

Embodiments of the present disclosure include animal feed products compositions, and kits, and methods and/or processes for making and using the same. In particular, embodiments of the present disclosure relate to an animal feed additive or a composition that includes an animal feed mixed with an animal feed additive, and to methods of manufacturing and/or using the same (e.g., to enhance the health of an animal). The animal feed additive (or feed supplement) can include a carrier and a fermentation product bound to the carrier. The additive can also include a buffering agent mixed with the fermentation product-bound carrier. In some embodiments, the supplement can include one or more additional ingredients. Other embodiments include a supplemented animal feed product that includes an animal feed component mixed with an animal feed supplement.

Some embodiments include a method of manufacturing an animal feed supplement. The method can include applying a fermentation product to a carrier to form a combination product. In some embodiments, the fermentation product can bind to the carrier to form a fermentation product-bound carrier. In some embodiments, the fermentation product can react with the carrier. The method can also include mixing the combination product with a buffering agent to form a buffered combination product. In some embodiments, the method can include mixing one or more additional ingredients with the fermentation product, combination product, and/or buffered combination product. Some embodiments include a method of manufacturing a supplemented animal feed product. The method can include mixing an animal feed supplement with an animal feed component. The animal feed component can be in solid form (e.g., animal food), liquid form (e.g., water), or other form (e.g., mixture). Certain embodiments can also include packaging the combination product, buffered combination product, and/or supplemented animal feed product, such as in a sealed, air-tight container.

Additional embodiments include a method of enhancing the health of an animal. The method can include administering an effective amount of an animal feed supplement composition to the animal so as to improve one or more health indicators of the animal or animal population (e.g., as compared to a control). For instance, the animal feed supplement composition can be administered to the animal by mixing the animal feed supplement (in granular, powdered, pellet, tablet, or other form) with an animal feed or feed component, such as food or water, or any other suitable method. The one or more health indicators can be selected from the group consisting of (decreased) gut lesion count and/or size, (decreased) gut bacteria count and/or size, (increased) weight gain, (enhanced) feed conversion ratio (i.e., the measure of an animal's efficiency in converting feed mass into body mass or weight), (decreased) mortality, and (decreased) mortality-adjusted feed/gain ratio.

Each of the foregoing and other embodiments, including specific components, characteristics, and/or features thereof, will now be discussed in further detail.

Exemplary Carriers

As used herein, "carrier" and similar terms refer to a component adapted for conveying a substance. For instance, the carrier component can comprise a solid, dry, and/or substantially dry carrier. In at least one embodiment, the carrier can comprise an organic and/or earthen carrier, comprising one or more organic and/or earth components or materials. Earthen carriers, components, and/or materials can include, for example, phyllosilicate(s) (e.g., of potassium (K), sodium (Na), calcium (Ca), and/or aluminum (Al)). The phyllosilicate can be of the chlorite, clay, mica, or serpentine variety. In at least one embodiment, the carrier can comprise one or more 1:1 or 2:1 clay mineral phyllosilicates.

Exemplary carriers can comprise, without limitation, aliettite, attapulgite, beidellite, bentonite, biotite, calcium silicate, calcium stearate, chlorite (e.g., clinochlore, chamosite, nimite, pennantite, and/or zinc, lithium, and/or calcium species thereof), cookeite, diatomite and/or other diatomaceous earth products, dickite, glauconite, halloysite, hectorite, hydrophobic silica, illite, kaolin, kaolinite, montmorillonite, muscovite, nacrite, nontronite, palygorskite, phyllite, saponite, sauconite, sepiolite, sericite, serpentine, smectite, talc, tonstein, and vermiculite. Certain carriers can be or comprise a naturally-occurring material or component. Other carriers can be or comprise an artificial and/or synthesized material or component. Carriers can also include (dried) plant materials and/or extracts, e.g., meal, flour, protein powders, seaweed, and so forth.

In some embodiments, the carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. As used herein, the term "substantially dry carrier" refers to a carrier having one or more of the foregoing moisture contents. Such substantially dry carriers can be understood generally to be solid, dry substances, while still having at least some moisture associated therewith.

In some embodiments, the carrier can be in powdered, granular, and/or particulate form or have an average particle size between about 20-297 μm (e.g., corresponding to approximately 625-50 mesh). In at least one preferred embodiment, the carrier can have an average particle size of about 74 μm (or about 200 mesh)+/−20%, 15%, 10%, 8%, or 5%. In certain embodiments, the solid carrier can be sized (e.g., by milling, crushing, grinding, etc.) to a suitable average particle size. Accordingly, in some embodiments, the solid carrier can be a mined and milled earth component having a suitable average particle size.

The carrier component can also or alternatively comprise a liquid or liquid composition (e.g., solution, suspension, colloid, mixture, etc.). Exemplary liquid carriers include, without limitation, water, a water source, a water supply, a liquid feed, an oil, medicaments, or any suitable liquid composition or carrier, such as a solvent (of a solution), a continuous phase (of a colloid), an external phase (of a suspension), etc.

Thus, the carrier can comprise any suitable material adapted for or capable of conveying a substance. In addition, the carrier can be ingested by an animal. For instance, the carrier can be edible and adapted to be consumed by the animal. For instance, the carrier can be known to be consumed by the animal Exemplary Fermentation Products As used herein, a (microbial, bacterial, yeast, fungal, etc.) "fermentation product" or similar term refers to a resultant of at least a period of anaerobic metabolism or cellular respiration (e.g., by one or more microorganisms), as understood by those skilled in the art, and not merely bulk or other growth (e.g., of such microorganism(s) on or in a growth medium). In some embodiment, the fermentation product can also result from (one or more periods of) aerobic metabolism. The fermentation product can comprise a condensed and/or extracted fermentation product, a presscake, fermentation solubles, a fermentation extract, dried fermentation solubles, liquid fermentation product, dried fermentation biomass, or a combination thereof. As used herein, a "liquid fermentation product" or similar term refers to a fermentation product in liquid form. For instance, the liquid fermentation product can be or comprise components of a liquid fermentation culture (e.g., a whole or complete microbial fermentation suspension culture), including a (at least partially spent or post-fermentation) liquid culture medium or component(s) thereof, one or more microorganisms and/or cellular material (e.g., structural components) thereof, one or more (fermentation, anaerobic, aerobic, and/or other) metabolites (produced by the microorganisms, and other components as known in the art).

The microbial fermentation product can be processed (e.g., purified, filtered, isolated, separated, etc.) or crude (e.g., unprocessed). In some embodiments, the fermentation product can comprise the substantially unpurified resultant of microbial anaerobic (and optionally aerobic) metabolism, including one or more (fermentation) metabolites, a (liquid) fermentation medium (e.g., remaining after a fermentation process), and/or microbial cellular and/or structural components (e.g., whole cell lysate).

In at least one embodiment, the fermentation product includes one or more microorganisms and/or cellular material, such as cellular structural components, including cell wall or fragments thereof, organelle or fragments thereof, and so forth, genetic material, macromolecules, or other component thereof. As used herein, the terms "microorganism," "microbial organism," "microbe," and the like refer to a species or strain of bacteria, archaea, certain protozoa, fungi, such as yeast, mold, etc., and algae, whether single-celled or multicellular organism, whether prokaryotic or eukaryotic, as understood by those skilled in the art. In some embodiments, the fermentation product includes (whole-cell) lysed microorganisms. The one or more microorganisms may include any number of microorganism species or strains, including, without limitation, one, two, three, four, five, six, seven, eight, nine, ten, or any other number of discrete (e.g., separately identifiable) microorganism strains or species.

Exemplary bacteria can include, without limitation: a species or strain of *Acetobacter*, including species aceti, xylinum, suboxydans, and so forth; a species or strain of *Bacillus*, including species apiaries, azotofixans, brevis, cereus, circulans, coagulans, laterosporus, lentus, licheniformis, macerans, marinus, megaterium, pasteurii, polymyxa, pulvifaciens, pumilus, schlegelii, sphaericus, stearothermophilus, subtilis, thiaminolyticus, thuringiensis, tusciae, and so forth; a species or strain of *Bacteroides*, including species amylophilus, copillosus, ruminocola, suis, and so forth; a species or strain of *Bifidobacterium*, including species adolescentis, animalis, bifidum, infantis, longum, thermophilum, and so forth; a species or strain of *Enterococcus*, including species cremoris, diacetylactis, faecium, intermedius, lactis, thermophilus, and so forth; a species or strain of *Lactobacillus*, including species acidophilus, brevis, buchneri, bulgaricus, casei, cellobiosus, curvatus, delbruekii, farciminis, fermentum, helveticus, lactis, plantarum, reuteri, and so forth; a species or strain of *Leuconostoc*, including species citovorum, dextranicum, mesenteroides, and so forth; a species or strain of *Megasphaera*, including species elsdenii, and so forth; a species or strain of *Pediococcus*, including species acidilactici, cerevisiae (damnosus), pentosaceus, and so forth; a species or strain of *Propionibacterium*, including species freudenreichii, shermanii, and so forth; a species or strain of *Rhodopseudomonas*, including species palustris, and so forth; and/or a species or strain of *Streptococcus*, including species cremoirs, diacetilactis, faecium, intermedius, lactis, salivarius, thermophilus, and so forth. Other embodiments include, for example, a species or strain of *Streptomyces*, including species natalensis, chattanoogensis, griseus, and so forth; a species or strain of *Xanthomonas*, including species campestris, and so forth; a species or strain of *Rhizopus*, including species niveus, and so forth; a species or strain of *Micrococcus*, including species lysodeikticus, and so forth; a species or strain of *Bacillus*, including species cereus, and so forth; and/or a species or strain of *Leuconostoc*, including species *citovorum, dextranicum*, and so forth.

In at least one embodiment, the fermentation product can include *Lactobacillus acidophilus* and/or cellular or structural components thereof, and one or more additional microbial (e.g., bacterial, fungal, yeast, mold, algae) species or strains (such as one or more of those listed herein) and/or cellular or structural components thereof.

In some embodiments, the one or more microorganisms do not include a bacteria or bacterial species or strain or are substantially devoid of bacteria and/or cellular or structural components thereof. For instance, in some embodiments, the fermentation product can be a fungal (e.g., yeast and/or mold) fermentation product that is substantially devoid of bacteria and/or cellular or structural components thereof. Exemplary fungi can include, without limitation, yeast of phyla *Ascomycota*, such as *Saccharomycotina* and/or *Taphrinomycotina* (e.g., *Schizosaccharomycetes*), and/or phyla *Basidiomycota*, such as *Agaricomycotina* (e.g., *Tremellomycetes*) and/or *Pucciniomycotina* (e.g., *Microbotryomycetes*). Exemplary yeast can include a species or strain of *Candida* (previously known as *Torulopsis*) including species *utilis, glabrata, guilliermondii, lipolytica, pseudotropicalis*, and so forth; a species or strain of *Kluyveromyces* including species *lactis*, and so forth; and/or a species or strain of *Saccharomyces*, including species *cerevisiae, boulardii, fragilis*, and so forth. Exemplary fungi can further include a species or strain of *Aspergillus*, including species *niger, orizae* (or *oryzae*), and so forth; a species or strain of *Penicillium* including specise *roquefortii*, and so forth; a species or strain of *Mucor*, including species *miehei, pusillus*, and so forth; a species or strain of *Morteirella*, including species *vinaceae*, and so forth; a species or strain of *Endothia*, including species *parasitica*, and so forth; and/or a species or strain of *Rhizomucor*, including species *miehei*, and so forth.

Some embodiments can be substantially devoid of fungi, yeast, mold, and/or cellular or structural components of any one or more of the foregoing. For instance, in some embodiments, the fermentation product can be a bacterial fermentation product that is substantially devoid of fungi, yeast, mold, and/or cellular or structural components of any one or more of the foregoing. Some embodiments can be substantially devoid of mold and/or cellular or structural components thereof. For instance, in some embodiments, the fermentation product can be a bacterial and/or yeast fermentation product that is substantially devoid of mold and/or cellular or structural components thereof. Some embodiments can be substantially devoid of algae and/or cellular or structural components thereof. Certain embodiments can include at least one bacterial species or strain, at least one fungal (or yeast, or mold) species or strain, and/or at least one algae species or strain.

In some embodiments, the one or more microorganisms may be beneficial, as understood by those skilled in the art, and/or may be generally recognized as safe (GRAS—an American Food and Drug Administration (FDA) designation, which indicates that a substance added to a food is considered safe by experts, and so is exempted from the usual Federal Food, Drug, and Cosmetic Act (FFDCA) food additive tolerance requirements), as understood by those skilled in the art. Thus, in at least one embodiment, the fermentation product can be substantially devoid of harmful and/or non-GRAS microorganisms, such as *E. coli, Salmonella, Listeria*, and/or *Campylobacter*, and/or cellular or structural components thereof. In some embodiments, the fermentation product can also be substantially devoid of certain (harmful) species or strains of *Mycobacterium,* *Clostridium, Pseudomonas, Shigella*, etc., and/or cellular or structural components thereof. Some embodiments can also or alternatively include one or more non-GRAS microbes, including without limitation one or more of the non-GRAS microbes disclosed herein.

In at least one embodiment, the one or more microorganisms of the fermentation product can be in a spore form, a vegetative form, a metabolic form, or a combination thereof. In some embodiments, however, the one or more microorganisms of the fermentation product can be non-living, non-viable, non-metabolic, and/or lysed. Accordingly, the fermentation product can comprise one or more non-living, non-viable, non-metabolic, and/or lysed microorganism, or cellular material (e.g., cell structural components) thereof. In addition, the fermentation product can be substantially devoid of one or more or any living (e.g., metabolic, dormant, sporulated, etc.) microorganisms. For instance, the fermentation product can comprise or be comprised of less than about 50%, less than about 40%, less than about 30%, less than about 25%, less than about 20%, less than about 15%, less than about 10%, less than about 5%, less than about 1%, less than about 0.5%, less than about 0.25%, less than about 0.1%, less than about 0.05%, less than about 0.01%, or less living or viable microorganisms. Accordingly, whereas probiotic products or direct-fed microorganism (DFM)-containing products may comprise live cultures, a source of live or viable, naturally occurring microorganisms, etc., some embodiments of the present disclosure can include a microbial fermentation product that is substantially or entirely devoid of live or viable microorganisms (of one or more varieties). In particular, the microorganisms can be intentionally killed and/or inactivated (e.g., by lysing, such as by sonication, vigorous mixing or blending, heat inactivation, pH inactivation, and so forth), as known in the art.

As indicated above, the fermentation product can also include a liquid (fermentation) medium (e.g., remaining after a fermentation process). Accordingly, the fermentation product can comprise a resultant of microbial liquid suspension culture grown in anaerobic (and optionally aerobic) conditions. The medium can include a liquid base component, such as water or a nutrient broth (e.g., Lysogeny Broth (LB), M9, fluid thioglycollate medium (FTM), NZ, NZY, or NZYM broths, SOB, SuperBroth, 2X YT, MOPS, SOC, TB, and so forth). The medium can also include one or more nutrient, growth, and/or other components (e.g., remaining after the fermentation process), such as (i) a carbon source (e.g., carbohydrate, such as glucose, sucrose, fructose, lactose, galactose, etc.), (ii) (inorganic) nitrogen source (e.g., ammonium, urea, etc.), (iii) protein or amino acid source (e.g., synthetic proteins or amino acids, natural, plant- and/or animal-derived proteins or amino acids, such as whey, milk, or milk-based product, etc.), (iv) vitamin (e.g., thiamine (Vitamin $B_1$), riboflavin (Vitamin $B_2$), niacin (Vitamin $B_3$), choline (Vitamin $B_4$), pantothenic acid (Vitamin $B_5$), pyridoxal (Vitamin $B_6$), biotin (Vitamin $B_7$), inositol (e.g., myo-inositol, Vitamin $B_8$, etc.), folic acid (Vitamin $B_9$), benzoic acid (e.g., para amino benzoic acid (PABA), Vitamin $B_{10}$, etc.), salicylic acid (Vitamin $B_{11}$), cobalamin (Vitamin $B_{12}$), Vitamin E, Vitamin D, Vitamin K, Vitamin A, Vitamin C, Vitamin H, etc.) or coenzyme thereof (e.g., ascorbate, retinol, etc.), (v) mineral (e.g., sodium, potassium, calcium, magnesium, etc.), (vi) trace element (e.g. copper, iron, manganese, zinc, molybdenum, chromium, selenium, etc.), (vii) essential element (e.g., magnesium, nitrogen, phosphorus, sulfur), (viii) salt(s) thereof (e.g., molybdate, cellulite, sulfate, chloride, propionate, etc.), (ix) salt (e.g., potassium phosphate, sodium phosphate, sodium chloride, ammonium chloride, magnesium sulfate, calcium chloride, etc.), (x) plant, including a component, part, or extract thereof (e.g., seaweed, such as kelp (e.g., brown algae (Phaeophyceae), such as *Ascophyllum nodosum*, optionally in meal form (e.g., dried and ground), (xi) yeast or extract thereof, (xii) enzyme, and/or (xiii) any other suitable (fermentation) culture component, as known to those skilled in the art. In addition, certain fermentation products can specifically exclude one or more of the foregoing or other known culture components (e.g., serum, growth factor, hormone, enzyme, antibiotic, beef extract, whole blood, heat-treated blood, etc.). It will be appreciated that one or more components found in the medium can be added to the medium before, during, and/or after one or more growth phases of the culture. Alternatively, or in addition, it will be appreciated that one or more components found in the medium can be produced by the microbes growing in the fermentation culture (e.g., as (fermentation) metabolites).

The fermentation product can include one or more metabolites. In at least one embodiment, the one or more metabolites comprise fermentation or other metabolites produced by the microorganisms (e.g., during anaerobic and optionally aerobic metabolism). Microbial fermentation metabolites can include, without limitation, one or more organic acids (e.g., lactic acid, humic acid, carboxylic acid (e.g., carbonic acid, acetic acid, formic acid, propionic acid, butyric acid, valeric acid, caproic acid, etc.), citric acid, salicylic acid, ascorbic acid, and so forth) amino acids, carbohydrates, fats, fatty-acids, enzymes, vitamins, and/or any other microbial metabolite component, as known to those skilled in the art. The metabolite(s) can be nutritionally beneficial to one or more animals (e.g., birds, mammals, etc.). In some embodiments, the fermentation product can include one or more microorganism waste products. In some embodiments, the metabolite(s) can be or comprise one or more microorganism waste products. In at least one embodiment, the fermentation product can be substantially devoid of antimicrobials (e.g., bacteriocins, antibiotics, hydrogen peroxide, and so forth); certain enzymes (e.g., proteases, amylases, lipases, glycosidases, DNA and/or RNA polymerases), and so forth.

In some embodiments, the metabolites can be at least partially purified (e.g., away from undesirable matter, such as waste products, fermentation medium, microbial cellular and/or structural material, etc.). Alternatively, the metabolites can be substantially unpurified in one or more embodiments. The substantially unpurified metabolites can be disposed in the microbial organisms and/or the (liquid) fermentation medium (e.g., outside of the microbial organisms). In some embodiments, the microorganisms can be lysed (e.g., such that substantially all of the metabolites are free in solution (i.e., not contained within the microorganisms)). Accordingly, in some embodiments, the fermentation product can comprise a mixture (e.g., solution, colloid, suspension, colloidal suspension, emulsion, etc.) of post-fermentation liquid medium, one or more microbial fermentation metabolites (e.g., anaerobic and/or aerobic metabolic products), and microbial cellular and/or structural components (e.g., whole cell lysate). In at least one embodiment, the mixture can be crude, raw, and/or substantially unpurified.

Exemplary fermentation methods, parameters, etc. include those known to those skilled in the art. The fermentation product can be prepared by one or more fermentation processes, including growing of one or more microbial (e.g., bacterial) species or strains or cell lines on a solid growth medium, as known in the art. The microbial culture can be grown in natural and/or ambient conditions in some embodiments. In other embodiments, the culture can be grown in artificial and/or optimized conditions. The microbial cultures can be grown at a biologically-suitable temperature (e.g., between about 20-50 degrees Celsius (° C.) or between about 30-40° C.), acidity (pH) (e.g., about 3.0-8.0), etc. Moreover, the growth medium can include one or more of the above-described or other medium components, including, without limitation, a (substantially solid) base component (e.g., agar or other suitable base component), nutrient, growth, and/or other components (e.g., carbon and/or (inorganic) nitrogen source, vitamin, mineral, trace element, essential element, amino acid, amino acid source, salt, yeast extract, and/or any other culture component, as known to those skilled in the art. In at least one embodiment, the microbial culture can be grown in aerobic and/or anaerobic conditions.

In some embodiments, the fermentation process can also include inoculating one or more (of the) viable microorganisms or microbial lines (or colonies thereof) into a liquid growth medium (e.g., to form a starter suspension culture), as known in the art. Liquid (suspension) cultures can also be grown in natural and/or ambient or artificial and/or optimized conditions, as described above. The liquid growth medium can include one or more of the above-described or other medium components.

In at least one embodiment, the viable starter culture (or a suitable portion thereof, including a whole fraction, extract, cell pellet, etc. thereof) can be transferred into liquid fermentation medium (e.g., to form a liquid fermentation culture). The liquid fermentation medium and/or culture can be disposed in a bioreactor, flask, or other suitable growth container. Moreover, the liquid fermentation medium and/or culture can include one or more of the above-described or other medium components. Similarly, the liquid fermentation culture can also be grown in natural and/or ambient or artificial and/or optimized conditions, as described above. In at least one alternative embodiment, the one or more viable microorganisms or microbial lines (or colonies thereof) can be inoculated directly into a liquid fermentation medium.

The fermentation culture can be grown under anaerobic and/or aerobic conditions for a first period of time and/or under first fermentation conditions, as known in the art and described herein. For instance, the fermentation culture can be grown for between about 0.5 days and about 5 days, at a temperature between about 10-50° C., and/or at a pH between about 2-10. After the first period of time, the fermentation culture can be grown under anaerobic and/or aerobic conditions for a second period of time and/or under second fermentation conditions, as known in the art and described herein. For instance, the second period of time can be between 0.5 days and about 5 days. The second fermentation conditions can include a temperature between about 10-50° C., a pH between about 2 and about 10, etc. In some embodiments, the second period of time and/or second fermentation conditions can be different than the first period of time and/or first fermentation conditions. For instance, the fermentation culture (or suitable portion thereof) can be transferred into the second fermentation conditions and/or a second fermentation medium. The second fermentation medium can be disposed in a bioreactor, flask, or other suitable growth container and/or can include one or more of the above-described or other medium components.

It will be appreciated that the fermentation process can also include additional period(s) of time, fermentation condition(s), fermentation media, etc., as known in the art and described herein. At the completion of the fermentation process, the fermentation culture can be or comprise a microbial fermentation product and/or can be optionally and/or additionally processed to form a microbial fermentation product. For instance, in certain embodiments, the (anaerobically and/or aerobically metabolic) microorganisms of the fermentation culture can be intentionally killed and/or inactivated (e.g., by lysing, such as by sonication, vigorous mixing, or blending, heat inactivation, pH inactivation or killing, and so forth), as known in the art. In at least some embodiments, fermentation metabolites disposed within the microbial cells or organisms of the fermentation culture can thereby be released into the medium (e.g., such that the metabolites are free in solution or other liquid medium type). The non-living, non-viable, non-metabolic, and/or lysed microorganism, or cellular material (cell structural components) thereof, can be retained in the liquid fermentation medium or at least partially (e.g., substantially and/or completely) removed therefrom (e.g., via (ultra) centrifugation, filtration, etc.). In certain embodiments, the fermentation product comprises a whole-cell and/or whole-culture lysate of the fermentation culture (e.g., without substantial removal, purification, isolation, etc. of one or more (e.g., any) component(s) of the fermentation culture). In alternative embodiments, however, one or more components of the fermentation culture can be at least partially and/or substantially removed, purified, isolated, etc.

Accordingly, the fermentation product can be in a substantially liquid (suspension, solution, colloid, gel, slurry, etc.) form and/or can include one or more components of a microbial fermentation culture (e.g., prepared as described herein and/or as known in the art). In at least one exemplary embodiment, the fermentation product can comprise a liquid suspension comprising the substantially unpurified resultant of microbial anaerobic and optionally aerobic metabolism, including (i) substantially all of the (fermentation) metabolites produced by the fermentation culture, (ii) the liquid fermentation medium in which the fermentation culture was grown (e.g., remaining after a fermentation process), and (iii) a whole-cell lysate the microorganisms or culture, including all of the microbial cellular and/or structural components of the microorganisms grown in the fermentation culture. Alternatively, the fermentation product can be in substantially solid form (e.g., dried, freeze-dried, vacuum-dried, heat-dried, dehydrated, extracted, etc.), comprising one or more of the foregoing components of the fermentation culture.

A further description of microbial fermentation products, process, ingredients, and the like can be found in U.S. Pat. No. 5,549,728, the entirety of which is incorporated by reference herein.

Exemplary Buffering Agents

As used herein, the terms "buffer," "buffering agent" and the like refer to a substance adapted for adjusting the acidity (as measured by pH) of a material or environment to which it is added and/or inhibiting (e.g., preventing, dampening, attenuating, etc.) a rapid change in the pH of the material or environment (e.g., when an acid or base is added). The buffering agent can be a weak acid or a weak base used to maintain the pH of a solution near a chosen value after the addition of another acid or base. In some embodiments, the buffering agent can comprise an electrolyte or electrolyte mixture.

Exemplary buffering agents can include, without limitation, calcium carbonate, fumaric acid, glucono-delta-lactone, magnesium oxide, magnesium sulfate, potassium carbonate, potassium bicarbonate, potassium chloride, potassium sulfate, sodium bentonite, sodium carbonate, sodium bicarbonate, sodium sesquicarbonate, and combinations thereof. In some embodiments, the buffering agents can be naturally-occurring (e.g., mined and/or otherwise collected, etc.), synthetic, or a mixture thereof. For instance, a sodium sesquicarbonate component can comprise naturally-occurring sodium sesquicarbonate, or a mixture of sodium carbonate and sodium bicarbonate, in certain embodiments.

The buffering agent can be in a substantially liquid (e.g., dissolved or otherwise disposed in a liquid) or in substantially solid and/or dry (e.g., particulate, granular, powdered, etc.) form. In at least one embodiment, the solid buffering agent can have a moisture content of less than about 20% by weight, less than about 19% by weight, less than about 15% by weight, less than about 10% by weight, less than about 5% by weight, less than about 3% by weight, less than about 2% by weight, or less than about 1% by weight. In at least one embodiment, the buffering agent can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. Accordingly, the solid buffering agent can be substantially dry. The buffering agent can also be in particulate, granular, powdered, or other form in some embodiments.

Exemplary Animal Feed Components

As used herein, "feed," "animal feed," "feed component," "animal feed component," and similar terms refer to a product adapted for animal consumption. For instance, in some embodiments, the feed or feed component can comprise an edible food that includes one or more essential nutrients (e.g., vitamins, minerals, proteins, carbohydrates, fats, fatty-acids, etc.) or other components necessary and/or sufficient for the growth and/or maintenance of live animals. In at least some embodiments, the feed or feed component is or comprises a complete, final, or finished feed product, as known in the art. In some embodiments, the feed or feed component is or comprises a pre-mix, grain, filler, or other components as known in the art. The feed or feed component can also or alternatively comprise water, molasses, or other consumable liquid or fluid.

Furthermore, such feed or feed component can be both edible and adapted to be consumed by the animal. For instance, the feed can be known to be consumed by the animal. As used herein, "animal" and similar terms refer to a multicellular, eukaryotic organism, including vertebrates such as birds, mammals, amphibians, reptiles, and fish, as well as invertebrates, including shellfish, such as mollusks, (e.g., squid, cuttlefish, octopus, etc.), crustaceans (e.g., crabs, lobsters, crayfish, shrimp, etc.), echinoderms (e.g. starfish, sea urchins, sea cucumbers, etc.), worms, etc. Illustrative animals include husbandry animals, cattle, (dairy) ruminants, domestic animals, farm animals, companion animals, pets, performance animals, etc. It is noted that humans are also animals, as understood by those skilled in the art. It will be appreciated, however, that in some embodiments, an animal feed is adapted for consumption by one or more non-human animals.

Certain embodiments can comprise a feed component adapted for consumption by a specific animal or animal type. For instance, some embodiments can comprise poultry feed (e.g., mash, pellets, crumbles, scratch, grain, etc.) as understood by those skilled in the art. Other embodiments can include feed adapted for ruminants or ruminating mammals (e.g., cattle (dairy, livestock, draft, etc.), goats, sheep, giraffes, yaks, deer, antelope, etc.), swine (e.g., pigs, hogs, boars, etc.), camelids (e.g., camels, alpacas, lamas, etc.), domestic house pets (e.g., cats, dogs, rabbits, etc.), rodents (e.g., hamsters, gerbils, guinea pigs, etc.), and so forth.

In some embodiments, the feed can be substantially dry. For instance, the feed can have a moisture content of less than about 20% by weight, less than about 19% by weight, less than about 15% by weight, less than about 10% by weight, less than about 5% by weight, less than about 3% by weight, less than about 2% by weight, or less than about 1% by weight. In at least one embodiment, the feed can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. In other embodiments, the feed can comprise a wet feed, having a moisture content greater than about 20% by weight.

Exemplary Additional Components

Some embodiments of the present disclosure can include one or more additional (health supplementing) components and/or ingredients. For instance, embodiments can include one or more vitamins (e.g., optionally selected, independently, from the group consisting of Vitamin A, Vitamin B complex (e.g., Vitamin B1, Vitamin B2, Vitamin B3, Vitamin B4, Vitamin B5, Vitamin B6, Vitamin B7, Vitamin B8, Vitamin B9, Vitamin B12, Choline), Vitamin C, Vitamin D, Vitamin E, and/or Vitamin K, etc.). An illustrative embodiment can include one or more minerals or trace minerals (or elements) (e.g., optionally selected, independently, from the group consisting of magnesium, calcium, phosphorus, potassium, sodium, boron, cobalt, chloride, chromium, copper, fluoride, iodine, iron, manganese, molybdenum, selenium, zinc, nickel, vanadium, silicon, and/or tin, etc.). Certain embodiments can include, for example, one or more of copper, manganese, and/or boron. Some embodiments can include one or more additional components selected from one or more: amino acids (e.g., essential and/or non-essential), health supplements (e.g., glucosamine, chondroitin, etc.), pharmaceuticals (e.g., chemical additive, medicated animal feed component, etc.), nutraceuticals, plants or plant parts (e.g., berries, leaves, stems, roots, shoots, seedling, cotyledon, etc.), plant products or extracts (e.g., seaweed extracts), herbs, phytonutrients, carotenoids, enzymes (e.g., amylase, xylanase, proteases, phytase, glucanase), probiotics, lignosulfonates, organic acids (e.g., humic acids), etc. Certain embodiments can be substantially and/or entirely devoid of probiotic and/or living microorganism of one or more variety.

Certain embodiments can include one or more surfactants, such as a binding and/or emulsifying agent (e.g., diacetyl tartaric acid esters of mono and diglucerides, edible fats and oils, edible fat-forming fatty acids, ethoxylated mono and diglycerides, methyl glucoside coconut oil ester, mineral oil, mono and diglycerides of edible fats or oils or edible fat-forming acids, monosodium phosphate derivatives of mono and diglycerides of edible fats or oils or edible fat-forming fatty acids, polyoxyethylene glycol 400 (mono and dioleates), polysorbate 80, polysorbate 60 (polyoxy ethylene (20) sorbitan monostearate, propylene glycol, sodium stearoyl lactylate, sorbitan mono-stearate with or without polysorbate 60, Tween 80 (T-80), etc., or combination thereof.

Some embodiments can include one or more stabilizing, anti-caking, and/or processing agents (e.g., carrageenan, gelatin gum, guar gum, lecithin, locust bean gum, stearic acid, sodiumcarboxy-methyl-cellulose, sodium silico-aluminate, tara gum, etc.), dust control agents (e.g., mineral oil, paraffin, etc., or a combination of two or more of the foregoing), preservatives (e.g., calcium propionate, sodium benzoate, etc.) and/or other beneficial animal feed ingredients, or combination thereof.

Some embodiments can also include one or more diluting agents or diluents. The one or more diluting agents or diluents can dilute one or more of the product or supplement components into the feed component of the mixture. The one or more diluting agents or diluents can also or alternatively enhance uniform distribution of the product or supplement component(s) into the feed component of the mixture. Exemplary diluting agents or diluents can include, without limitation, a vegetable or grain, an oil (e.g., corn, canola, olive, etc.), a pre-mix, a vitamin and/or mineral mix, an initial portion of the animal feed component, an earthen carrier, or any other suitable product or supplement component-diluting or distributing element. In certain embodiments that include a buffering agent, the one or more diluting agents or diluents can comprise the buffering agent.

Exemplary Combination Products

As used herein, "combination product" and similar terms refer to a composition, mixture, or other combination (e.g., reaction product) that includes at least a fermentation product and a carrier of the present disclosure. For instance, the combination product can be, comprise, or include the fermentation product applied to the carrier, the fermentation product bound to the carrier (also termed the fermentation product-bound carrier), and/or the fermentation product bound to the carrier and mixed with one or more additional components, such as a buffering agent (also termed buffered combination product, buffered fermentation product-bound carrier, etc.) and/or additional ingredient (e.g., vitamin(s), mineral(s) or trace mineral(s), amino acid(s), health supplement(s), pharmaceutical(s), nutraceutical(s), plant(s) or plant part(s), plant product(s) or extract(s), herb(s), phytonutrient(s), carotenoid(s), enzyme(s), probiotic(s), lignosulfonate(s), organic acid(s), and/or any other suitable additive or other component, as described above. Certain embodiments can be substantially and/or entirely devoid of probiotic and/or living microorganism of one or more variety.

In at least one embodiment, the fermentation product can be bound to the carrier to form a combination product (or fermentation product-bound carrier). For instance, the fermentation product can be physically and/or chemically bound to the carrier (e.g., by chemical reaction or means). In some embodiments, the fermentation product can be bound to the carrier by static electricity or by a force other than (general or macro) static electricity. In certain embodiments, binding of the fermentation to the carrier can increase bioavailability of at least one of the metabolites (e.g., relative to being free in solution or extracted, purified, and/or isolated from solution or cell). Accordingly, the fermentation product can be applied to the carrier, bound to the outer surface of the carrier, and/or bound to a portion of the carrier adjacent to or below the surface. For instance, in some embodiments, at least a portion of the liquid fermentation product can be (i) adsorbed to the surface of the carrier and/or (ii) absorbed below the surface of the carrier. The liquid fermentation product can also be bound to the carrier by drying thereon and/or therein after being applied thereto. Thus, in certain embodiments, the liquid fermentation product can be at least partially dry-bound to the carrier. As used herein, "dry-bound," and similar terms refers to the persistent and/or sustained physical association of two or more substances by physical and/or chemical forces established during a drying process.

In at least one embodiment, the fermentation product can substantially or at least partially coat the carrier. For instance, the fermentation product can be applied to the carrier (e.g., such that the liquid portion of the fermentation product does not dissolve the carrier and/or such that the applied portion of the fermentation product substantially or at least partially coat surrounds the carrier). In some embodiments, at least a portion of the fermentation product can be chemically bound to the carrier. For instance, the fermentation product can be reacted with the carrier (e.g., such that a physical and/or chemical binding reaction occurs). The reaction can be endothermic or exothermic. In addition, the reaction can be facilitated and/or accelerated by one or more enzymes or other reaction components or parameters (e.g., heat, air (flow), mixing, etc.). The enzyme or other component can be a metabolic reaction product, a fermentation culture component, and/or a separate component added prior to or during application of the fermentation product to the carrier.

In some embodiments, the fermentation product-bound carrier can be in a solid form. For instance, the fermentation product-bound carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the fermentation product-bound carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. Accordingly, the fermentation product-bound carrier can be substantially dry. In other embodiments, the fermentation product-bound carrier can be in a substantially liquid (suspension, solution, colloid, gel, slurry, etc.) form.

In one or more embodiments, the fermentation product can be bound to the carrier such that the fermentation product and/or one or more components thereof is maintained at a suitable pH or pH range, or in an environment having a suitable pH or pH range. For instance, in some embodiments, the carrier and/or the fermentation product-bound carrier can provide and/or have a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5.

Some embodiments can include one or more methods and/or materials for maintaining the fermentation product and/or one or more components thereof, the fermentation product-bound carrier, and/or other product or composition described herein at the suitable pH or pH range, or in an environment having a suitable pH or pH range. For instance, in one or more embodiments, the fermentation product and/or one or more components thereof can be reacted with the carrier, adsorbed to the surface of the carrier, and/or absorbed below the surface of the carrier such that the fermentation product and/or one or more components thereof is maintained at the suitable pH or pH range, or in a (carrier) environment having the suitable pH or pH range. In at least one embodiment, the fermentation product and/or one or more components thereof can react (chemically) with the carrier and/or one or more components thereof to form a combination product having a suitable pH. Thus, in at least one embodiment, the carrier (or reacted carrier and fermentation product) can provide and/or have the suitable pH or pH range, or an environment having the suitable pH or pH range.

In some embodiments, the addition of a buffering agent (e.g., as described herein) to the fermentation product-bound carrier can provide the suitable pH or pH range, or environment having the suitable pH or pH range. For instance, in one or more embodiments, the buffering agent and/or the fermentation product-bound carrier plus buffering agent combination (i.e., buffered fermentation product-bound carrier) can provide and/or have a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5. In at least one embodiment, the fermentation product-bound carrier can be mixed and/or reacted with the buffering agent at a ratio of less than, up to, at least, and/or between approximately 1:20, approximately 1:15, approximately 1:10, approximately 1:9, approximately 1:8, approximately 1:7, approximately 1:6, approximately 1:5, approximately 1:4, approximately 1:3, approximately 1:2, approximately 1:1, or approximately 1:0.5, fermentation product-bound carrier to buffering agent, or vice versa.

The fermentation product-bound carrier and buffering agent can both be in substantially dry and/or solid form. Thus, in some embodiments, the buffered fermentation product-bound carrier can also be in a solid form. For instance, the buffered fermentation product-bound carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the fermentation product-bound carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. Accordingly, the buffered fermentation product-bound carrier can be substantially dry. Alternatively, one or more of the fermentation product-bound carrier and buffering agent can be in wet, fluid, and/or liquid form (e.g., suspension, solution, colloid, gel, slurry, etc.).

In at least one embodiment, the addition of the fermentation product-bound carrier or buffered fermentation product-bound carrier to an animal feed component (e.g., as described herein) can provide the suitable pH or pH range, or environment having the suitable pH or pH range, for the animal feed, and vice versa. For instance, in one or more embodiments, the mixture of animal feed and fermentation product-bound carrier or buffered fermentation product-bound carrier can provide and/or have a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5.

In some embodiments, the fermentation product-bound carrier or buffered fermentation product-bound carrier can be mixed (or reacted) with the animal feed component at any suitable ratio. In one or more embodiments, for example, the fermentation product-bound carrier can be mixed with the animal feed component at a ratio of up to, at least, and/or between approximately 0.05-50 kg, approximately 0.1-25 kg, approximately 0.25-10 kg, approximately 0.25-8 kg, approximately 0.25-5 kg, approximately 0.25-4 kg, approximately 0.25-2 kg, approximately 0.25-1 kg, approximately 0.5-10 kg, approximately 0.5-8 kg, approximately 0.5-5 kg, approximately 0.5-4 kg, approximately 0.5-2 kg, approximately 0.5-1 kg, approximately 1-10 kg, approximately 1-8 kg, approximately 1-5 kg, approximately 1-4 kg, approximately 1-2 kg, approximately 1.5-10 kg, approximately 1.5-8 kg, approximately 1.5-5 kg, approximately 1.5-4 kg, approximately 1.5-2 kg, approximately 2-10 kg, approximately 2-8 kg, approximately 2-5 kg, approximately 2-4 kg, approximately 4-10 kg, approximately 4-5 kg, approximately 1 kg, approximately 1.5 kg, approximately 2 kg, approximately 4 kg, approximately 5 kg, approximately 8 kg, approximately 10 kg, approximately 25 kg, or approximately 50 kg of fermentation product-bound carrier per metric ton of the feed component, or any range therebetween. In some embodiments, the fermentation product-bound carrier can be mixed with the animal feed component at a ratio of less than about 50 kg, less than about 25 kg, less than about 10 kg, less than about 5 kg, less than about 4 kg, less than about 3 kg, less than about 2 kg, less than about 1 kg, or less than about 0.5 kg of fermentation product-bound carrier per metric ton of the feed component, or any range therebetween. In certain embodiments, the fermentation product-bound carrier can be mixed with the animal feed component at a ratio of greater than about 0.25 kg, greater than about 0.5 kg, greater than about 0.75 kg, greater than about 1 kg, greater than about 2 kg, greater than about 3 kg, greater than about 4 kg, greater than about 5 kg, greater than about 6 kg, greater than about 8 kg, greater than about 10 kg, greater than about 15 kg, or more of fermentation product-bound carrier per metric ton of the feed component, or any range therebetween. In at least one embodiment, the fermentation product-bound carrier can be mixed with the animal feed component at a ratio of about 100 g, 200 g, 250 g, 300 g, 400 g, 500 g, 750 g, 1000 g, 1500 g, 2000 g, 2500 g, 5000 g, or more of fermentation product-bound carrier per 1000 kg of feed or feed component, or any range therebetween, or ratio corresponding thereto.

In other embodiments, the buffered fermentation product-bound carrier can be mixed with the animal feed component at a ratio of up to, at least, and/or between approximately 0.05-50 kg, approximately 0.1-25 kg, approximately 0.25-10 kg, approximately 0.25-8 kg, approximately 0.25-5 kg, approximately 0.25-4 kg, approximately 0.25-2 kg, approximately 0.25-1 kg, approximately 0.5-10 kg, approximately 0.5-8 kg, approximately 0.5-5 kg, approximately 0.5-4 kg, approximately 0.5-2 kg, approximately 0.5-1 kg, approximately 1-10 kg, approximately 1-8 kg, approximately 1-5 kg, approximately 1-4 kg, approximately 1-2 kg, approximately 1.5-10 kg, approximately 1.5-8 kg, approximately 1.5-5 kg, approximately 1.5-4 kg, approximately 1.5-2 kg, approximately 2-10 kg, approximately 2-8 kg, approximately 2-5 kg, approximately 2-4 kg, approximately 4-10 kg, approximately 4-5 kg, approximately 1 kg, approximately 1.5 kg, approximately 2 kg, approximately 4 kg, approximately 5 kg, approximately 8 kg, approximately 10 kg, approximately 25 kg, or approximately 50 kg of buffered fermentation product-bound carrier per metric ton of the feed component, or any range therebetween.

In some embodiments, the buffered fermentation product-bound carrier can be mixed with the animal feed component at a ratio of less than about 50 kg, less than about 25 kg, less than about 10 kg, less than about 8 kg, less than about 5 kg, less than about 5 kg, less than about 4 kg, less than about 3 kg, less than about 2 kg, less than about 1 kg, or less than about 0.5 kg of buffered fermentation product-bound carrier per metric ton of the feed component, or any range therebetween. In certain embodiments, the buffered fermentation product-bound carrier can be mixed with the animal feed component at a ratio of greater than about 0.25 kg, greater than about 0.5 kg, greater than about 0.75 kg, greater than about 1 kg, greater than about 2 kg, greater than about 3 kg, greater than about 4 kg, greater than about 5 kg, greater than about 6 kg, greater than about 8 kg, greater than about 10 kg, greater than about 15 kg, or more of buffered fermentation product-bound carrier per metric ton of the feed component, or any range therebetween. In at least one embodiment, the buffered fermentation product-bound carrier can be mixed with the animal feed component at a ratio of about 100 g, 200 g, 250 g, 300 g, 400 g, 500 g, 750 g, 1000 g, 2500 g, 2000 g, 2500 g, 5000 g, or more of buffered fermentation product-bound carrier per 1000 kg of feed component, or any range therebetween, or ratio corresponding thereto.

Thus, in some embodiments, the fermentation product-bound carrier or buffered fermentation product-bound carrier can be mixed with the animal feed component at any suitable ratio.

In some embodiments, the fermentation product-bound carrier or buffered fermentation product-bound carrier can be packaged (e.g., with or without an animal feed component as described herein). In at least one embodiment, the packaging can reduce, inhibit, and/or (substantially) prevent substantial absorption or loss of moisture (e.g., outside a suitable range, as described herein) by the packaged product. It will be appreciated that a moisture content above a certain threshold can increase the risk or occurrence of one or more undesirable effects. For instance, in at least one embodiment, a moisture content of greater than about 20% by weight, greater than about 15% by weight, greater than about 10% by weight, or greater than about 5% by weight can permit, enhance, improve, and/or augment microbial growth on or in (or contamination of) the packaged product, reduce the stability of the packaged product or one or more components thereof, etc.

On the other hand, in some embodiments, a moisture content below a certain threshold can increase the risk or occurrence of one or more other undesirable effects. For instance, a moisture content of less than about 0.25% by weight, less than about 0.5% by weight, less than about 0.75% by weight, less than about 1% by weight, less than about 1.5% by weight, less than about 2% by weight, less than about 3% by weight, less than about 4% by weight, or less than about 5% by weight, can reduce the effectiveness of the packaged product or one or more components thereof (e.g., in enhancing one or more health indicators in an administered animal or animal population), enhance, improve, and/or augment the decomposition of the packaged product or one or more components thereof, etc.

In one or more alternative embodiments, the combination product can comprise the liquid fermentation product combined and/or mixed with a liquid carrier. For instance, the liquid fermentation product can be combined and/or mixed with water (e.g., an animal's water supply) to form a combination product. The liquid fermentation product can be dissolved, suspended, dispersed, or otherwise disposed in the liquid carrier. As used herein, combining and/or mixing a liquid fermentation product with a liquid carrier such that the liquid fermentation product becomes dissolved, suspended, dispersed, or otherwise disposed in the liquid carrier comprises applying the fermentation product to the carrier such that the fermentation product binds to the carrier. The pH of the liquid composition/combination product can be adjusted, as necessary, by a buffering agent, as described herein. Additional ingredient(s), as described above, can also be added to (e.g., dissolved, suspended, dispersed, or otherwise disposed in) the liquid carrier.

Methods

Some embodiments of the present disclosure can include methods of manufacturing an animal feed supplement and/or a supplemented animal feed. An illustrative method can optionally include producing a microbial fermentation product (e.g., as known in the art and/or described herein). For instance, the method of producing a microbial fermentation product can include culturing one or more live and/or viable microorganisms (or microbial species or strains or lines thereof) under anaerobic (and optionally aerobic) conditions (e.g., in a fermentation medium, etc., as known in the art and/or described herein) and/or such that the microorganisms produce at least one fermentation metabolite. Some embodiments can also include (intentionally) killing and/or inactivated (e.g., by lysing, such as by sonication, vigorous mixing, or blending, heat inactivation, pH inactivation or killing, and so forth) such that the fermentation product is substantially devoid of the live and/or viable microorganisms (e.g., substantially devoid of one or more or any living microorganisms). The fermentation product can, however, include one or more (e.g., substantially all) cellular and/or structural components of the microorganisms. The fermentation product can also include at least one fermentation metabolite and/or the fermentation culture medium (or component(s) thereof).

Some embodiments include mixing (or reacting) one or more vitamins and/or minerals with the fermentation product. In particular, one or more of the vitamins and/or minerals can be bound or chelated to at least one of the metabolites of the fermentation product (e.g., such that the bioavailability of the at least one of the metabolites is increased thereby).

Illustrative methods can also include forming a combination product by at least applying the fermentation product to a carrier. For instance, the fermentation product (in substantially liquid form) can be fluidly applied to the carrier, such as by spraying, pouring, dripping, etc. and/or such that the fermentation product binds to the carrier. The carrier can be or comprise a solid and/or substantial dry carrier, such as an earthen carrier, as described herein, optionally comprising one or more phyllosilicates. The carrier can also or alternatively be or comprise a liquid carrier, such as water or a water source or supply, as described herein. The fermentation product can be applied to or combined or mixed with the carrier, such that fermentation product becomes dispersed within or throughout the carrier.

The fermentation product can be applied to the carrier at a ratio of up to, at least, and/or between approximately 1:1 by weight, approximately 1:1.5 by weight, approximately 1:2 by weight, approximately 1:2.5 by weight, approximately 1:3 by weight, approximately 1:3.5 by weight, approximately 1:4 by weight, approximately 1:5 by weight, approximately 1:6 by weight, approximately 1:7 by weight, approximately 1:8 by weight, approximately 1:9 by weight, or approximately 1:10 by weight, fermentation product to carrier, or vice versa. At least a portion of the fermentation product can physically and/or chemically react or mix with and/or bind to the carrier. For instance, at least a portion of the fermentation product can be adsorbed to a surface of the carrier and/or absorbed below the surface of the carrier.

At least one embodiment can include mixing the carrier and/or fermentation product-bound carrier (e.g., before, after, and/or while applying the fermentation product to the carrier). The carrier and/or fermentation product-bound carrier can be mixed in any suitable container or on any suitable surface. For instance, the carrier can be mixed by rotation (e.g., in a drum or barrel), by shaking (e.g., on or in a tray or receptacle), by stirring (e.g., on or in a tray or receptacle), and so forth. In addition, the carrier can be mixed at any suitable speed. Regardless of the specific type of mixing, container, surface, etc., mixing can be measured in terms of revolutions, rotations, and/or reciprocations per minute (rpm). For instance, the carrier can be mixed at a speed of between about 1-500 rpm, between about 5-300 rpm, between about 10-200 rpm, between about 15-100 rpm, between about 20-60 rpm, between about 30-50 rpm, or any range therebetween. In some embodiments, suitable mixing speed can ensure that the carrier, fermentation product-bound carrier, and/or other combination product is appropriately and/or optimally processed. For instance, a mixing speed above a certain threshold can reduce the size and/or uniformity of product particles below an appropriate and/or optimal level. Similarly, a mixing speed below a certain threshold can inhibit sufficient or successful application or coating of the fermentation product around or about the carrier and/or can lead to clumping of the product, causing the size and/or uniformity of product particles to be inappropriate and/or suboptimal. Regardless, the effects of improper mixing can include reduced stability and/or activity of the product.

Certain embodiments can include applying air or a flow of air. The air or flow of air can be applied (i) while mixing the carrier and/or fermentation product-bound carrier (e.g., before, after, and/or while applying the fermentation product to the carrier), (ii) over a specific, predetermined, or defined period of time (e.g., between about 6-120 hours, between about 12-96 hours, between about 12-120 hours, between about 48-60 hours, etc.) and/or (iii) until the fermentation product-bound carrier achieves a suitable moisture content, as described herein. Moreover, the air flow can be applied at a rate of greater than or equal to about 25 $m^3$/minute, up to about 200 $m^3$/minute, between about 25 $m^3$/minute and about 200 $m^3$/minute, between about 40 $m^3$/minute and about 150 $m^3$/minute, between about 50 $m^3$/minute and about 100 $m^3$/minute, or between about 60 $m^3$/minute and about 75 $m^3$/minute, in certain embodiments. Preferably, the air or air flow can be applied at a rate of about 68 $m^3$/minute. In some embodiments, suitable temperature can ensure that the mixture dries to a suitable moisture content in a suitable amount of time, thereby reducing, inhibiting, and/or substantially preventing and/or avoiding product caking or clumping, microbial contamination and/or growth, etc.

In at least one embodiment, the method includes maintaining the carrier, mixed fermentation product and carrier, and/or fermentation product-bound carrier at a suitable reaction temperature (e.g., below about 60° C., below about 58° C., below about 56° C., below about 55° C., below about 52° C., below about 50° C., below about 48° C., below about 45° C., below about 42° C., below about 40° C., below about 39° C., below about 38° C., below about 37° C., below about 35° C., below about 32° C., below about 30° C., below about 25° C., below about 20° C., etc. and/or above about 5° C., above about 10° C., above about 15° C., or above about 20° C.) during the reaction and/or binding process. In some embodiments, suitable reaction temperature can ensure that the reaction occurs at an optimal speed/rate, the reaction product is dried (at a suitable rate) to a suitable moisture content, etc. In addition, the method can include maintaining the reaction product and/or fermentation product-bound carrier at a suitable maintenance and/or storage temperature (e.g., below about 42° C., below about 40° C., below about 39° C., below about 38° C., below about 37° C., below about 35° C., below about 32° C., below about 30° C., below about 28° C., below about 25° C., below about 20° C., below about 15° C., or below about 10° C., below about 5° C., below about 2° C., etc. and/or above about 0° C., above about 2° C., above about 5° C., above about 10° C., or above about 15° C., etc.) after or near completion of the reaction and/or binding process. In some embodiments, a suitable maintenance temperature can improve, enhance, and/or maintain the stability, longevity, and/or composition (i.e., avoiding, reducing, and/or inhibiting decomposition) of the reaction product and/or fermentation product-bound carrier.

In addition, in one or more embodiments, the aforementioned parameters (e.g., mixing, applying, air, temperature, etc.) can cause and/or enhance binding of the fermentation product to the carrier. For instance, the parameters can cause and/or enhance adsorption of the fermentation product to the surface of the carrier, absorption of the fermentation product below the surface of the carrier, and/or drying of the fermentation product on or in the carrier. Thus, the fermentation product can be or become dry-bound to the carrier in some embodiments.

In at least one embodiment, the method can also include maintaining the fermentation product-bound carrier at a suitable reaction pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, etc.) during the reaction and/or binding process. In some embodiments, the suitable pH can ensure and/or enhance the chemical reaction. The method can also include maintaining the fermentation product-bound carrier at a suitable maintenance pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, etc.) after or near completion of the reaction and/or binding process. In some embodiments, the suitable maintenance pH can improve, enhance, and/or maintain the stability, longevity, and/or composition (i.e., avoiding, reducing, and/or inhibiting decomposition) of the reaction product and/or fermentation product-bound carrier. In addition, the suitable maintenance pH can inhibit microbial contamination and/or growth on or in the product (e.g., especially at lower pH). In at least one embodiment, the reaction can have a pH lowering effect (e.g., on the carrier and/or mixture of carrier and fermentation product).

Some embodiments include mixing (e.g., as described above or otherwise mixing) one or more vitamins and/or minerals with the fermentation product-bound carrier (or fermentation product-applied carrier). As indicated above, one or more of the vitamins and/or minerals can be bound or chelated to at least one of the metabolites of the fermentation product (e.g., such that the bioavailability of the at least one of the metabolites is increased thereby). Vitamins and/or minerals can also enhance the nutritional value of the product. Embodiments can also include mixing (e.g., as described above or otherwise mixing) the fermentation product-bound carrier with one or more additional components (e.g., one or more humic acids, plant extracts, such as a seaweed extract, lignosulfonate, etc.), as described herein.

Some embodiments include mixing (e.g., as described above or otherwise mixing) the fermentation product-bound carrier with an animal feed component (e.g., to form a nutrient enhanced or supplemented animal feed product). The fermentation product-bound carrier can be mixed with the animal feed component at any suitable ratio (e.g., as described herein). It will be appreciated that the mixture can comprise a consistent, heterogeneous mixture of fermentation product-bound carrier and animal feed component. In some embodiments, suitable ratio of fermentation product-bound carrier to feed component can ensure proper nutritional supplementation and/or nutrient delivery to the administered animals. For instance, if too little of the fermentation product-bound carrier is added, the animal may not receive adequate nutrition. However, if too much of the fermentation product-bound carrier is added, the performance of the product may be reduced and/or the health benefits to the animal(s) may be reduced.

Some embodiments include mixing (e.g., as described above or otherwise mixing) the fermentation product-bound carrier with a buffering agent to form a buffered combination product. The buffering agent can be mixed with the fermentation product-bound carrier at any suitable ratio (e.g. up to, at least, and/or between approximately 1:20, approximately 1:15, approximately 1:10, approximately 1:9, approximately 1:8, approximately 1:7, approximately 1:6, approximately 1:5, approximately 1:4, approximately 1:3, approximately 1:2, approximately 1:1, or approximately 1:0.5, fermentation product-bound carrier to buffering agent). In some embodiments, suitable ratio of fermentation product-bound carrier to buffering agent can ensure optimal performance, activity, stability, and/or longevity of the product. In some embodiments, suitable ratio of fermentation product-bound carrier to buffering agent can ensure proper nutritional supplementation and/or nutrient delivery to the administered animals.

Some embodiments include mixing (e.g., as described above or otherwise mixing) the fermentation product, combination product, or buffered combination product with a feed component to form a supplemented feed composition. The fermentation product, combination product, or buffered combination product can be mixed with a feed component at a ratio of at least, up to, between, and/or about 1:100, 1:150:1:200, 1:250, 1:300, 1:350, 1:400, 1:450, 1:500, 1:600, 1:700, 1:750, 1:800, 1:900, 1:1000, 1:1250, 1:1500, 1:1750, 1:2000, 1:2500, 1:3000, 1:3500, 1:4000, 1:4500, 1:5000, etc., by weight or by volume (fermentation product, combination product, or buffered combination product-to-feed component). It will be appreciated that the feed component can be or comprise solid, liquid, or other form of food or drink (e.g., water).

Thus, completed formulations of certain embodiments of the present disclosure can include a fermentation product-bound carrier or a buffered fermentation product-bound carrier (with or without an animal feed component and/or one or more additional components), as described herein. In at least one embodiment, the completed formulation(s) can be sized (e.g., milled, crushed, grinded, and/or screened) to obtain a substantially uniform particle size (e.g., on average, between about 20-297 µm (or approximately 625-50 mesh), preferably about 74 µm (or approximately 200 mesh)+/− 20%, 15%, 10%, 8%, or 5%). The formulations can optionally be manufactured in granule, powder, pellet, bolus, tablet, or other suitable form. In some embodiments, the completed formulation can be packaged (e.g., so as to reduce, inhibit and/or substantially prevent loss (e.g., yield reduction), contamination (e.g., with live and/or viable microorganisms, fungus, parasite, etc.), and/or substantial absorption or loss of moisture by the packaged product. Thus, the method can also include packaging the composition, such as by vacuum or other sealing in an air-tight container.

An exemplary method of implementing an embodiment of the present disclosure is illustrated in FIG. 1. FIG. 1 depicts a diagrammatic flow chart illustrating a method of manufacturing and optionally administering an animal feed supplement according to various embodiments of the present disclosure. It will be appreciated, however, that portions of the illustrated method can comprise separate embodiments of the present disclosure (e.g., methods of manufacturing a composition, producing a nutrient enhanced animal feed product, enhancing the health of an animal, etc.). As illustrated in FIG. 1, an embodiment of the present disclosure can include a step 10 of providing a liquid fermentation product as described herein. In an alternative embodiment, the fermentation product can be in a solid or non-liquid form. Some embodiments can include an optional step 12a of adding one or more additional ingredients, such as vitamin(s), mineral(s) or trace mineral(s), amino acid(s), health supplement(s), pharmaceutical(s), nutraceutical(s), plant(s) or plant part(s), plant product(s) or extract(s), herb(s), phytonutrient(s), carotenoid(s), enzyme(s), probiotic(s), lignosulfonate(s), organic acid(s), etc., to the liquid fermentation product. It will be appreciated that such additional ingredients can also or alternatively be added to the medium before, during, and/or after one or more growth phases of the fermentation culture. Certain embodiments can be substantially and/or entirely devoid of probiotic and/or living microorganism of one or more variety.

Certain embodiments can include a step 14 of applying the fermentation product to a dry carrier as described herein to form a first product (e.g., a fermentation product-applied carrier). For example, the applying step 14 can include one or more of spraying, pouring, dripping, etc. the fermentation product onto the carrier, binding or dry-binding the fermentation product to the carrier, reacting the fermentation product with the carrier, and/or drying the fermentation product on or in the carrier. The applying step 14 can also or alternatively include drying the combination product, fermentation product-applied carrier, or fermentation product-bound carrier and/or any other process step described herein and/or known in the art. Some embodiments can include an optional step 12b of adding one or more additional ingredients to the fermentation product-applied carrier.

As illustrated in FIG. 1, the liquid fermentation product can be applied to a dry carrier to form a fermentation product-bound carrier. As indicated above, however, in one or more alternative embodiments, the carrier can be or comprise a liquid or non-dry carrier, such as water. Accordingly, the liquid fermentation product can be applied to the liquid carrier, such as by mixing, stirring, etc. The fermentation product can also be in solid or non-liquid form and applied to a dry or liquid carrier in certain embodiments. For instance, a non-liquid fermentation product can be dissolved, suspended, or otherwise applied to a liquid carrier, or mixed, combined, or otherwise applied to a solid carrier without necessarily departing from the scope of the present disclosure.

At least one embodiment can include a step 16 of mixing the fermentation product-bound carrier with at least one buffering agent, as described herein, to form a second product (e.g., a buffered fermentation product-bound carrier). Some embodiments can include an optional step 12c of adding one or more additional ingredients, as described above, to the buffered fermentation product-bound carrier. One or more embodiments can also include a step 18 of mixing the buffered fermentation product-bound carrier with an animal feed product to form a third product (e.g., a (buffered) supplemented animal feed product. Some embodiments can include an optional step 12d of adding one or more additional ingredients, as described above, to the (buffered) supplemented animal feed product. In addition, some of such embodiments can include a step 20 of administering the (buffered) supplemented animal feed product to one or more animals.

As further illustrated in FIG. 1, certain embodiments can include a step 22 of mixing the fermentation product-bound carrier with an animal feed product (without a buffering agent) to form a fourth product (e.g., a (un-buffered) supplemented animal feed product). Some embodiments can include an optional step 12e of adding one or more additional ingredients, as described above, to the (un-buffered) supplemented animal feed product. In addition, some embodiments can include a step 24 of administering the (un-buffered) supplemented animal feed product to one or more animals. Alternative embodiments can include a step 26 of administering the fermentation product-bound carrier to one or more animals or a step 28 of administering the buffered fermentation product-bound carrier to one or more animals.

It will be appreciated that some embodiments of the present disclosure provide one or more advantages over existing products and methods. For instance, as indicated above, the fermentation product-bound carrier, buffering agent, and feed component can each be in substantially dry and/or solid form (e.g., having moisture content(s) as described herein), in certain embodiments. Such substantially dry and/or solid compositions can be ideal and/or uniquely suited for various types of animal feeds. For instance, certain animals may prefer substantially dry and/or solid feeds. In addition, certain feed compositions (e.g., feed supplements, supplemented feeds, etc.) may be easier, faster, more economical, and/or safer (for animals and/or users) to handle, store, move, mix, distribute, test, and/or eat in a substantially dry and/or solid form. Thus, substantially dry and/or solid compositions can provide a significant advantage over substantially wet and/or liquid compositions, in some situations, application, or embodiments. For instance, mixing a liquid fermentation product with a powdered buffering agent can be messy, expensive, and time-consuming, etc.

Moreover, in at least some embodiments, the liquid fermentation product and dry buffering agent can be incompatible (for direct mixing). For instance, the liquid fermentation product can have a low pH (e.g., less than or equal to about 5, 4, 3, or 2, in some embodiments), while the dry buffering agent (such as carbonate-based buffering agent) can have a higher pH (e.g., greater than or equal to about 8, 9, 10, or 11, for instance, about 8.4 (sodium bicarbonate), about 9.8 (sodium sesquicarbonate), or about 11.4 (sodium carbonate)). Accordingly, the application of an acidic liquid fermentation product to a basic, dry, carbonate-based buffering agent to, or vice versa, at a suitable ratio, may cause a violent reaction. Similarly, such mixing can induce the rapid formation of carbon dioxide and/or result in the loss of the carbonate buffering agent.

Thus, by first reacting or binding the liquid fermentation culture with or to a dry carrier, and then combining the dry combination product with the dry buffering agent, some embodiments can provide or produce a dry, buffered fermentation product in dry form without requiring that the liquid fermentation culture be dried out (via filtering, evaporation, dehydrating, vacuum, heat, air, etc.). The dry, buffered fermentation product can be made without substantial loss of the buffering agent or molecular component thereof and without mixing, reacting, and/or combining a complete, liquid microbial fermentation suspension culture, as described herein, with a dry buffering agent. In addition, the dry, buffered fermentation product can be made without substantial loss of the one or more component of the fermentation culture. For instance, the liquid medium of the culture, include soluble or other components thereof, need not be removed in order to combine the fermentation product with the buffering agent. Thus, embodiments of the present disclosure enable the use of a complete fermentation suspension culture in the production of animal feed supplements and supplemented animal feeds.

Accordingly, certain embodiments of the present disclosure provide a fermentation product comprising whole-cell or whole-culture lysate, instead of a culture extract or isolate. For instance, the fermentation product can comprise a liquid suspension comprising the substantially unpurified resultant of microbial anaerobic metabolism, including (i) substantially all of the (soluble and/or fermentation) metabolites produced by the fermentation culture, (ii) the liquid fermentation medium in which the fermentation culture was grown (e.g., remaining after a fermentation process), and (iii) whole-cell lysate, including all of the microbial cellular and/or structural components of the microorganisms grown in the fermentation culture, rather than a partial purification or isolate of certain fermentation culture metabolites or microorganisms. Spraying and/or dry-binding the liquid fermentation product (e.g., as a crude, raw, whole and/or complete fermentation culture) to the substantially dry and/or solid carrier can provide (substantially all of the) components of a whole and/or substantially complete microbial fermentation culture in a substantially dry and/or solid form (e.g., without dehydrating and/or otherwise drying the whole suspension culture).

It will be appreciated, however, that certain embodiments of the present disclosure can be administered to the animal(s) through the animal's water supply (e.g., disposed in a trough, bowl, pond, puddle, dispenser, etc.) and/or through a substantially wet or at least partially liquid animal food feed product. For instance, in at least one embodiment, the dry fermentation product-bound carrier can be at least partially dissolved in the water supply (e.g., such that consumption (drinking) of the water constitutes administration of an effective amount of the animal feed supplement to the animal). In other embodiments, the fermentation product, carrier, fermentation product-applied carrier can be in liquid form and/or can be introduced into the animal's water supply. Furthermore, the buffering agent and/or additional component(s) can also be administered through the animal's water supply, the at least partially liquid animal feed product, etc.

Furthermore, rather than a probiotic/direct-fed microorganism (DFM)-containing products comprising live cultures, a source of live (viable), microorganisms, etc., some embodiments of the present disclosure can include a microbial fermentation product that is substantially devoid of live and/or viable microorganisms. Thus, certain embodiments of the present disclosure do not provide a significant source of live and/or viable microorganisms. As such, rather than introducing probiotic microorganisms into the subject animal, certain embodiments of the present disclosure introduce components adapted to support, increase, and/or maintain a healthy and/or desirable population of beneficial gut flora in the subject animal, and/or control, reduce, and/or maintain an acceptable and/or suitable population of non-pathogenic, pathogenic, and/or potentially pathogenic gut flora in the subject animal.

It will be appreciated that embodiments of the present disclosure can enhance, support, aid, boost, bolster, augment, and/or assist the health and/or well-being of an animal when an effective amount thereof is administered to the animal. Thus, some embodiments can include enhancing, supporting, aiding, boosting, bolstering, augmenting, and/or assisting the health of an animal by administering an effective amount of an animal feed supplement composition of the present disclosure to the animal so as to improve one or more of the aforementioned health indicators of the animal or animal population. As used herein, administering can comprise feeding the feed supplement composition to the animal such that the animal ingests the effective amount of the animal feed supplement composition. For instance, the feed supplement composition can be mixed with a feed component that the animal is known to eat.

Alternatively, the animal feed supplement composition (e.g., fermentation product-applied carrier or buffered fermentation product-applied carrier, with or without additional ingredient(s)) can be administered directly to the animal (e.g., without mixing the product into the animal's feed or water). For instance, in some embodiments, the animal feed supplement composition can be processed into a pellet or tablet and/or fed directly to the animal. Pelleted embodiments may require a suitable amount of heat, pressure, moisture, or other parameter, but have been found to deliver similar beneficial results when administered to animals (see below).

The one or more health indicators can include gut lesion count, gut bacteria count and/or plate count, animal weight and/or body mass, feed consumption, feed conversion ratio, mortality, metabolism and/or metabolic rate, digestion, nitrogen retention, milk production (in mammals), milk quality (as measured by milk fat and/or protein content, etc.), overall health and appearance, and so forth. In particular embodiments, the method can comprise enhancing weight gain, reducing feed consumption and/or improving feed conversion ratios (especially under biotic and abiotic stress conditions), reducing mortality (and/or mortality rates in a population), reducing incidence of gut lesions, reducing counts, plate counts, and/or other incidents of bacteria (e.g., *E. coli*, *Salmonella*, etc.), improving nitrogen retention, increasing milk production in mammals, improving milk quality (increased fat and/or protein content, etc.) in mammals, improving metabolizable energy levels, improving digestion, improving overall health and appearance, and so forth. Such health indicators can be measured in an individual animal and/or in a population (e.g., as an average).

Exemplary Experimental Results

Broiler chickens were obtained from a single source and randomly assigned to the treatments outlined below. The birds were fed commercial feed formulated to meet minimum nutrient requirements of a typical commercial broiler chicken diet using the NRC Nutrient Requirements for Poultry in a mash form for starters (0-21 days), growers (22-42 days), and finishers (43-49 days), with or without one of the feed supplement additives. The additives included, in the alternative: (i) fermentation product-bound carrier composition ("combo")—added to the feed at a final ratio of about 1:4000 ("combo (1)"—or about 250 grams of additive per 1000 kg feed), about 1:2000 ("combo (2)"—or about 500 grams of additive per 1000 kg feed), or about 1:1000 ("combo (3)"—or about 1000 grams of additive per 1000 kg feed) by weight (the fermentation product being mixed/reacted with the carrier at a ratio of about 1:1 by weight); (ii) buffering agent ("buffer")—added to the feed at a final ratio of about 1:250—or about 4 kg buffering agent per 1000 kg feed, or (iii) fermentation product-bound carrier with buffering agent ("combo+buffer")—with the buffering agent and fermentation product-bound carrier added to the feed, respectively, at the final ratios described above (such that the fermentation product-bound carrier is combined with the buffering agent at a ratio of about 1:16 (about 250 grams of additive per 4 kg buffering agent), about 1:8 (about 500 grams of additive per 4 kg buffering agent), or about 1:4 (about 1000 grams of additive per 4 kg buffering agent).

The additives were added to each ration of finished feed by premixing an appropriate, pre-determined amount of the additive in a small plastic bag with the addition of about 100 grams of corn oil (e.g., to enhance uniform distribution of the additive) and about 454 grams of feed (e.g., to dilute the additive into an initial portion of feed and enhance uniform distribution of the additive in the feed). The initial dilution (or premix) was then mixed with the remainder of the full ration until thorough distribution of the additive in the feed was achieved. All diets and fresh well water were offered ad libitum. Each floor pen study included 10 replicates per treatment, 56 birds per replicate, mixed-sex (50% male and 50% female) broilers, for a total of 560 birds per treatment. Other ratios, amounts, combinations, etc. were tested without being reported in the present disclosure. Accordingly, other ratios, amounts, combinations, etc. are also contemplated herein.

The results were obtained from feed studies conducted under mild biotic stress and normal grow-out conditions with moderate environmental temperature conditions or under abiotic high heat stress. Two different mild biotic stress conditions were tested. A first condition included *Eimeria acervulina* and *Escherichia coli* contamination of the litter conditions to induce contamination of the chicken intestinal system (21 day trial). A second condition included *Clostridium perfringens* (Necrotic Enteritis-causing bacteria) contamination of the litter conditions to induce contamination of the chicken intestinal system (21 day trial). Temperature regime for the heat stress conditions was as follows: 85-90° F. (about 29-32° C.) for days 0-7, 100° F. (about 37-38° C.) for days 8-14, and 105° F. (about 40-41° C.) for days 15-49. Measured health indicators included gut lesion score/formation, *Escherichia coli* gut count, incidence of *Salmonella* infection, weight gain, feed conversion ratio, and death/mortality.

The gut lesion scores included both coccidiosis signs and necrotic enteritis signs and were performed on ten birds per replicate (or 100 birds per treatment) using a scale from 0-4: 0=no lesion found, 1=slight redness but no cell sluffing (mucus), 2=moderate redness and/or slight cell sluffing, 3=severe redness and/or severe cell sluffing, 4=actual bleeding observed. Testing for *Escherichia coli* was performed on ten birds per replicate (or 100 birds per treatment) using USDA/FSIS MLG 3.02, section 3.7 procedure and are presented as (log 10) bacterial plate count. *Salmonella* incidence was tested following USDA/FSIS MLG 4.03 procedure and are present as number of birds with measurable bacterial infection.

Weight gain was measured as the difference between bird weight at day 0 and day 21 for the entire flock of each treatment (or 560 birds), and is presented as the average increase (in pounds) for each treatment. Feed conversion ratios were calculated and presented as the treatment average ratio of ration weight (over the 21 day treatment) to the bird weight (at the end of each treatment) for the entire flock of each treatment (or 560 birds). Mortality was measured as the raw number of deaths (by the end of day 21 and day 49 of the treatment) for the entire flock (or 560 birds per treatment) under abiotic (severe heat) stress conditions and is expressed as the number of deaths per 100 birds. The percent change of each health indicator for each feed ration formulation as compared to a control population of birds fed with finished feed alone ("control") or finished feed with buffering agent at a ratio of about 4 kg buffering agent per 1000 kg of finished feed ("control+buffer") is also presented.

Statistical significance of the results is indicated by a letter (or letter combination) indicator following each data number. Numbers within a row that that do not share at least one letter indicator have a statistically significant difference. In other words, the difference between any two numbers in the same row is statistically significant; (P<0.05) as determined by Least Significant Difference, if the two numbers do not have at least one letter indicator in common.

TABLE 1

Gut lesion score under biotic stress conditions (*Eimeria acervulina* and *Escherichia coli* contamination).

| Control | Combo (1) | Combo (2) | Combo (3) |
| --- | --- | --- | --- |
| 1.59 a | 1.23 b | 1.18 b | 1.03 b |
| — | 22.64% decrease | 25.79% decrease | 35.22% decrease |
| Control | Combo(1) + buffer | Combo(2) + buffer | Combo(3) + buffer |
| 1.59 a | 1.14 b | 1.03 b | 0.76 b |
| — | 28.30% decrease | 35.22% decrease | 52.20% decrease |
| Control + buffer | Combo(1) + buffer | Combo(2) + buffer | Combo(3) + buffer |
| 1.18 a | 1.14 a | 1.03 a | 0.76 a |
| — | 3.39% decrease | 12.71% decrease | 35.59% decrease |

TABLE 2

Gut lesion score under biotic stress conditions
(*Clostridium perfringens* contamination).

| Control | Combo (1) | Combo (2) | Combo (3) |
|---|---|---|---|
| 1.75 a | 1.43 b | 1.19 bc | 0.97 c |
| — | 18.29% decrease | 32.00% decrease | 44.57% decrease |
| Control | Combo(1) + buffer | Combo(2) + buffer | Combo(3) + buffer |
| 1.75 a | 1.20 b | 0.86 c | 0.92 bc |
| — | 31.43% decrease | 50.86% decrease | 47.43% decrease |
| Control + buffer | Combo(1) + buffer | Combo(2) + buffer | Combo(3) + buffer |
| 1.08 ab | 1.20 b | 0.86 a | 0.92 ab |
| — | 11.11% increase | 20.37% decrease | 14.81% decrease |

TABLE 3

Gut lesion score under abiotic (severe heat) stress conditions.

| Day of the trial | Control | Combo (1) | Combo (2) | Combo (3) |
|---|---|---|---|---|
| Day 21 | 2.10 a | 1.92 a | 1.03 b | 1.11 b |
|  | — | 8.57% decrease | 50.95% decrease | 47.14% decrease |
| Day 49 | 2.03 a | 1.67 b | 1.33 c | 1.10 c |
|  | — | 17.73% decrease | 34.48% decrease | 45.81% decrease |
| Day of the trial | Control | Combo(1) + buffer | Combo(2) + buffer | Combo(3) + buffer |
| Day 21 | 2.10 a | 1.53 b | 0.97 c | 0.87 c |
|  | — | 27.14% decrease | 53.81% decrease | 47.43% decrease |
| Day 49 | 2.03 a | 1.49 b | 1.06 c | 0.68 d |
|  | — | 26.60% decrease | 47.78% decrease | 66.50% decrease |
| Day of the trial | Control + buffer | Combo(1) + buffer | Combo(2) + buffer | Combo(3) + buffer |
| Day 21 | 1.51 a | 1.53 a | 0.97 b | 0.87 b |
|  | — | 1.32% increase | 35.76% decrease | 42.38% decrease |
| Day 49 | 1.40 a | 1.49 b | 1.06 c | 0.68 d |
|  | — | 6.43% increase | 24.29% decrease | 51.43% decrease |

TABLE 4

Gut bacteria count under biotic stress conditions (*Eimeria acervulina*
and *Escherichia coli* contamination)

| Bacteria | Control | Combo (1) | Combo (2) | Combo (3) |
|---|---|---|---|---|
| *E. coli* (log10) | 6.7413 a | 6.5526 a | 5.5551 b | 5.0367 b |
|  | — | 2.80% decrease | 17.60% decrease | 25.29% decrease |
| *Salmonella* incidence | 40.0 a | 32.0 ab | 25.0 b | 30.0 ab |
|  | — | 20.00% decrease | 37.50% decrease | 25.00% decrease |
| Bacteria | Control | Combo(1) + buffer | Combo(2) + buffer | Combo(3) + buffer |
| *E. coli* (log10) | 6.7413 a | 6.0324 b | 5.7032 b | 4.7189 c |
|  | — | 10.52% decrease | 15.40% decrease | 30.00% decrease |
| *Salmonella* incidence | 40.0 a | 38.0 a | 23.0 b | 18.0 b |
|  | — | 5.00% decrease | 42.50% decrease | 55.00% decrease |
| Bacteria | Control + buffer | Combo(1) + buffer | Combo(2) + buffer | Combo(3) + buffer |
| *E. coli* (log10) | 6.2003 a | 6.0324 a | 5.7032 a | 4.7189 b |
|  | — | 2.71% decrease | 8.02% decrease | 23.89% decrease |
| *Salmonella* incidence | 38.0 a | 38.0 a | 23.0 b | 18.0 b |
|  | — | 0.00% decrease | 39.47% decrease | 52.63% decrease |

TABLE 5

Gut bacteria count under biotic stress conditions (*Clostridium perfringens* contamination).

| Bacteria | Control | Combo (1) | Combo (2) | Combo (3) |
|---|---|---|---|---|
| *E. coli* (log10) | 6.4502 a | 6.3789 a | 5.5998 b | 5.1405 b |
|  | — | 1.11% decrease | 13.18% decrease | 20.30% decrease |
| *Salmonella* incidence | 43.0 a | 34.0 a | 31.0 a | 30.0 a |
|  | — | 20.93% decrease | 27.91% decrease | 30.23% decrease |

| Bacteria | Control | Combo(1) + buffer | Combo(2) + buffer | Combo(3) + buffer |
|---|---|---|---|---|
| *E. coli* (log10) | 6.4502 a | 6.2689 a | 5.2937 b | 4.5652 c |
|  | — | 2.81% decrease | 17.93% decrease | 29.22% decrease |
| *Salmonella* incidence | 43.0 a | 32.0 ab | 29.0 bc | 17.0 c |
|  | — | 25.58% decrease | 32.56% decrease | 60.47% decrease |

| Bacteria | Control + buffer | Combo(1) + buffer | Combo(2) + buffer | Combo(3) + buffer |
|---|---|---|---|---|
| *E. coli* (log10) | 6.1123 a | 6.2689 a | 5.2937 b | 4.5652 c |
|  | — | 2.56% increase | 13.39% decrease | 25.31% decrease |
| *Salmonella* incidence | 31.0 a | 32.0 a | 29.0 ab | 17.0 b |
|  | — | 3.23% increase | 6.45% decrease | 45.16% decrease |

TABLE 6

Gut bacteria count under abiotic (severe heat) stress conditions.

| Bacteria | Control | Combo (1) | Combo (2) | Combo (3) |
|---|---|---|---|---|
| Day 21 of the trial | | | | |
| *E. coli* (log10) | 6.3346 a | 6.1792 a | 5.3677 b | 4.9623 b |
|  | — | 2.45% decrease | 15.26% decrease | 21.66% decrease |
| *Salmonella* incidence | 42.0 a | 34.0 ab | 26.0 b | 25.0 b |
|  | — | 19.05% decrease | 38.10% decrease | 40.48% decrease |
| Day 49 of the trial | | | | |
| *E. coli* (log10) | 6.5378 a | 6.0500 b | 5.5158 c | 5.1571 c |
|  | — | 7.46% decrease | 15.63% decrease | 21.12% decrease |
| *Salmonella* incidence | 53.0 a | 40.0 b | 26.0 c | 26.0 c |
|  | — | 24.53% decrease | 50.94% decrease | 50.94% decrease |

| Bacteria | Control | Combo(1) + buffer | Combo(2) + buffer | Combo(3) + buffer |
|---|---|---|---|---|
| Day 21 of the trial | | | | |
| *E. coli* (log10) | 6.3346 a | 5.7606 b | 5.2173 c | 4.5824 d |
|  | — | 9.06% decrease | 17.64% decrease | 27.66% decrease |
| *Salmonella* incidence | 42.0 a | 35.0 a | 21.0 b | 13.0 b |
|  | — | 16.67% decrease | 50.00% decrease | 69.05% decrease |
| Day 49 of the trial | | | | |
| *E. coli* (log10) | 6.5378 a | 5.8796 b | 5.1981 c | 4.5609 d |
|  | — | 10.07% decrease | 20.49% decrease | 30.24% decrease |
| *Salmonella* incidence | 53.0 a | 40.0 b | 23.0 c | 16.0 c |
|  | — | 24.53% decrease | 56.60% decrease | 69.81% decrease |

| Bacteria | Control + buffer | Combo(1) + buffer | Combo(2) + buffer | Combo(3) + buffer |
|---|---|---|---|---|

TABLE 6-continued

Gut bacteria count under abiotic (severe heat) stress conditions.

Day 21 of the trial

| | | | |
|---|---|---|---|
| E. coli (log10) | 5.6282 ab | 5.7606 a | 5.2173 b | 4.5824 c |
| | — | 2.35% increase | 7.30% decrease | 18.58% decrease |
| Salmonella incidence | 37.0 a | 35.0 a | 21.0 b | 13.0 b |
| | — | 5.41% decrease | 43.24% decrease | 64.86% decrease |

Day 49 of the trial

| | | | |
|---|---|---|---|
| E. coli (log10) | 5.7932 a | 5.8796 a | 5.1981 b | 4.5609 c |
| | — | 1.49% increase | 10.27% decrease | 21.27% decrease |
| Salmonella incidence | 38.0 a | 40.0 a | 23.0 b | 16.0 b |
| | — | 5.26% increase | 39.47% decrease | 57.89% decrease |

TABLE 7

Average body weight gain (lbs) under biotic stress conditions (*Eimeria acervulina* and *Escherichia coli* contamination).

| Control | Combo (1) | Combo (2) | Combo (3) |
|---|---|---|---|
| 1.5145 a | 1.5192 ab | 1.5250 ab | 1.5324 c |
| — | 0.31% increase | 0.69% increase | 1.18% increase |

| Control | Combo(1) + buffer | Combo(2) + buffer | Combo(3) + buffer |
|---|---|---|---|
| 1.5145 a | 1.5264 b | 1.5382 c | 1.5463 c |
| — | 0.79% increase | 1.56% increase | 2.10% increase |

| Control + buffer | Combo(1) + buffer | Combo(2) + buffer | Combo(3) + buffer |
|---|---|---|---|
| 1.5284 ab | 1.5264 a | 1.5382 bc | 1.5463 c |
| — | 0.13% decrease | 0.64% increase | 1.17% increase |

TABLE 8

Average body weight gain (lbs) under biotic stress conditions (*Clostridium perfringens* contamination).

| Control | Combo (1) | Combo (2) | Combo (3) |
|---|---|---|---|
| 1.5195 a | 1.5257 ab | 1.5308 bc | 1.5406 c |
| — | 0.41% increase | 0.74% increase | 1.39% increase |

| Control | Combo(1) + buffer | Combo(2) + buffer | Combo(3) + buffer |
|---|---|---|---|
| 1.5195 a | 1.5317 b | 1.5439 c | 1.5511 c |
| — | 0.80% increase | 1.61% increase | 2.08% increase |

| Control + buffer | Combo(1) + buffer | Combo(2) + buffer | Combo(3) + buffer |
|---|---|---|---|
| 1.5340 a | 1.5317 b | 1.5439 ac | 1.5511 c |
| — | 0.15% decrease | 0.65% increase | 1.11% increase |

TABLE 9

Average body weight gain (lbs) under abiotic (severe heat) stress conditions.

| | Control | Combo (1) | Combo (2) | Combo (3) |
|---|---|---|---|---|
| Day 0-21 | 1.4570 a | 1.4866 b | 1.5088 c | 1.5252 d |
| | — | 2.03% increase | 3.56% increase | 4.68% increase |
| Day 0-49 | 5.7599 a | 5.8715 b | 5.9636 c | 6.0302 d |
| | — | 1.94% increase | 3.54% increase | 4.69% increase |

| | Control | Combo(1) + buffer | Combo(2) + buffer | Combo(3) + buffer |
|---|---|---|---|---|
| Day 0-21 | 1.4570 a | 1.4895 b | 1.5267 c | 1.5487 d |
| | — | 2.23% increase | 4.78% increase | 6.29% increase |
| Day 0-49 | 5.7599 a | 5.8944 b | 6.0107 c | 6.1123 d |
| | — | 2.34% increase | 4.35% increase | 6.12% increase |

| | Control + buffer | Combo(1) + buffer | Combo(2) + buffer | Combo(3) + buffer |
|---|---|---|---|---|
| Day 0-21 | 1.4868 a | 1.4895 a | 1.5267 b | 1.5487 c |
| | — | 0.18% increase | 2.68% increase | 4.16% increase |
| Day 0-49 | 5.8914 a | 5.8944 a | 6.0107 b | 6.1123 c |
| | — | 0.05% increase | 2.02% increase | 3.75% increase |

TABLE 10

Feed conversion ratio under biotic stress conditions (*Eimeria acervulina* and *Escherichia coli* contamination)

| Control | Combo (1) | Combo (2) | Combo (3) |
|---|---|---|---|
| 1.3778 a<br>— | 1.3695 a<br>0.60% decrease | 1.3521 a<br>1.87% decrease | 1.3404 a<br>2.71% decrease |
| Control | Combo(1) + buffer | Combo(2) + buffer | Combo(3) + buffer |
| 1.3778 a<br>— | 1.3532 ab<br>1.79% decrease | 1.3409 ab<br>2.68% decrease | 1.3210 b<br>4.12% decrease |
| Control + buffer | Combo(1) + buffer | Combo(2) + buffer | Combo(3) + buffer |
| 1.3552 a<br>— | 1.3532 a<br>0.15% decrease | 1.3409 a<br>1.06% decrease | 1.3210 a<br>2.52% decrease |

TABLE 11

Feed conversion ratio under biotic stress conditions (*Clostridium perfringens* contamination).

| Control | Combo (1) | Combo (2) | Combo (3) |
|---|---|---|---|
| 1.3806 a<br>— | 1.3717 a<br>0.64% decrease | 1.3616 a<br>1.38% decrease | 1.3464 a<br>2.48% decrease |
| Control | Combo(1) + buffer | Combo(2) + buffer | Combo(3) + buffer |
| 1.3806 a<br>— | 1.3586 ab<br>1.59% decrease | 1.3449 ab<br>2.59% decrease | 1.3263 b<br>3.93% decrease |
| Control + buffer | Combo(1) + buffer | Combo(2) + buffer | Combo(3) + buffer |
| 1.3570 a<br>— | 1.3586 a<br>0.12% increase | 1.3449 a<br>0.89% decrease | 1.3263 a<br>2.26% decrease |

TABLE 12

Feed conversion ratio under abiotic (severe heat) stress conditions.

| | Control | Combo (1) | Combo (2) | Combo (3) |
|---|---|---|---|---|
| Day 0-21 | 1.4019 a<br>— | 1.3846 ba<br>1.23% decrease | 1.3643 bc<br>2.68% decrease | 1.3524 c<br>3.53% decrease |
| Day 0-49 | 1.9162 a<br>— | 1.8917 ab<br>1.28% decrease | 1.8588 ab<br>3.00% decrease | 1.8415 b<br>3.90% decrease |
| | Control | Combo(1) + buffer | Combo(2) + buffer | Combo(3) + buffer |
| Day 0-21 | 1.4019 a<br>— | 1.3782 ab<br>1.69% decrease | 1.3485 bc<br>3.81% decrease | 1.3299 c<br>5.14% decrease |
| Day 0-49 | 1.9162 a<br>— | 1.8822 ab<br>1.77% decrease | 1.8436 b<br>3.79% decrease | 1.8168 b<br>5.19% decrease |
| | Control + buffer | Combo(1) + buffer | Combo(2) + buffer | Combo(3) + buffer |
| Day 0-21 | 1.3814 a<br>— | 1.3782 ba<br>0.23% decrease | 1.3485 bc<br>2.38% decrease | 1.3299 c<br>3.73% decrease |
| Day 0-49 | 1.8799 a<br>— | 1.8822 a<br>0.12% increase | 1.8436 a<br>1.93% decrease | 1.8168 a<br>3.36% decrease |

TABLE 13

Mortality under abiotic (severe heat) stress conditions - expressed as dead bird count per 100 birds.

| | Control | Combo (1) | Combo (2) | Combo (3) |
|---|---|---|---|---|
| Day 0-21 | 4.6429 d<br>— | 4.2857 d<br>7.69% decrease | 3.5714 ad<br>23.08% decrease | 3.0357 a<br>34.62% decrease |
| Day 0-49 | 12.6087 d<br>— | 10.4348 c<br>17.24% decrease | 8.4783 bc<br>32.76% decrease | 6.9565 b<br>44.83% decrease |
| | Control | Combo(1) + buffer | Combo(2) + buffer | Combo(3) + buffer |
| Day 0-21 | 4.6429 d<br>— | 3.9286 bd<br>15.38% decrease | 3.3929 ab<br>26.92% decrease | 2.5000 a<br>46.15% decrease |
| Day 0-49 | 12.6087 d<br>— | 9.7826 c<br>22.41% decrease | 7.3913 b<br>41.38% decrease | 5.2174 a<br>58.62% decrease |
| | Control + buffer | Combo(1) + buffer | Combo(2) + buffer | Combo(3) + buffer |
| Day 0-21 | 3.9286 b<br>— | 3.9286 b<br>0.00% decrease | 3.3929 ab<br>13.64% decrease | 2.5000 a<br>36.36% decrease |
| Day 0-49 | 9.5652 c<br>— | 9.7826 c<br>2.27% increase | 7.3913 b<br>22.73% decrease | 5.2174 a<br>45.45% decrease |

Additional trials included the administration of various compositions of the present disclosure in pellet form. Studies were conducted under abiotic high heat stress. Temperature regime for the heat stress conditions was as follows: 35° C. for days 0-7, 37.8° C. for days 8-14 and 40.6° C. for days 15-49. The broiler chicken were obtained from the same source and randomly assigned to the treatments. The birds were fed a commercial feed rations for starters (0-21 days), growers (22-42 days) and finishers (43-49 days) with or without additive. All diets and fresh well water were offered ad libitum.

In a first floor pen study with 8 replications per treatment, 24 birds per replication, the fermentation product-bound carrier composition was added to antibiotic-free, corn-soy based feeds at levels of 0 (control), 0.05% by weight, or 0.10% by weight, or pelleted at 76.7° C. or applied post-pelleting at 0.05% by weight. Effect of carrier+fermentation product (or fermentation product-bound carrier composition) (CF) applied pre- or post-pelleting on Body Weight (BW), Feed/Gain ratio, Mortality-Adjusted Feed/Gain ratio (MAF/G), and percent mortality of broilers exposed to heat stress for 21 days, as compared to the control set (no additive), are presented in Table 14.

TABLE 14

| Treatment | BW (g) | Feed/Gain | MAF/G | Mortality (%) |
|---|---|---|---|---|
| Control (basal) | 572 | 1.70 a* | 1.46 a | 30.7 a |
| CF 0.05% pre-pelleting | 567 | 1.48 b | 1.36 b | 18.8 b |
| CF 0.10% pre-pelleting | 552 | 1.43 b | 1.34 b | 15.6 b |
| CF 0.05% post-pelleting | 573 | 1.36 b | 1.30 b | 13.1 b |

*Means followed by different letters in the same column are significantly different (P < 0.001).

In a second set of experiments, with 10 replications per treatment, 70 birds per replication, the CF composition was applied as dry additive to the feed at 500 grams of fermentation product-bound carrier per 1000 kg of finished feed, the liquid fermentation product was applied to the drinking water at 250 milliliters of fermentation product per 1000 liters of drinking water, or as combination of the two application methods. Numbers within a row followed by different letters are significantly different (P<0.05) as determined by Least Significant Difference.

TABLE 15

Body weight (g) day 0-21.

| Untreated Control Finished feed alone | Carrier + fermentation (500 g/1000 kg finished feed) | fermentation (250 ml/1000 liters of drinking water) | Carrier + fermentation (500 g/1000 kg finished feed) and fermentation (250 ml/1000 liters of drinking water) |
|---|---|---|---|
| 808 b | 821 a | 822 a | 829 a |
| — | 1.61% increase | 1.73% increase | 2.60% increase |

TABLE 16

Body weight (g) day 0-49.

| Untreated Control Finished feed alone | Carrier + fermentation (500 g/1000 kg finished feed) | fermentation (250 ml/1000 liters of drinking water) | Carrier + fermentation (500 g/1000 kg finished feed) and fermentation (250 ml/1000 liters of drinking water) |
|---|---|---|---|
| 2976 d | 3112 b | 3131 ab | 3159 a |
| — | 4.57% increase | 5.21% increase | 6.15% increase |

TABLE 17

Feed conversion ratios day 0-21.

| Untreated Control Finished feed alone | Carrier + fermentation (500 g/1000 kg finished feed) | fermentation (250 ml/1000 liters of drinking water) | Carrier + fermentation (500 g/1000 kg finished feed) and fermentation (250 ml/1000 liters of drinking water) |
|---|---|---|---|
| 1.3878 d | 1.3579 bc | 1.3456 b | 1.3266 a |
| — | 2.15% decrease | 3.04% decrease | 4.41% decrease |

TABLE 18

Feed conversion ratios day 0-49.

| Untreated Control Finished feed alone | Carrier + fermentation (500 g/1000 kg finished feed) | fermentation (250 ml/1000 liters of drinking water) | Carrier + fermentation (500 g/1000 kg finished feed) and fermentation (250 ml/1000 liters of drinking water) |
|---|---|---|---|
| 1.9017 e | 1.8541 bc | 1.8432 ab | 1.8258 a |
| — | 2.50% decrease | 3.08% decrease | 4.00% decrease |

TABLE 19

Mortality (%) day 0-21.

| Untreated Control Finished feed alone | Carrier + fermentation (500 g/1000 kg finished feed) | fermentation (250 ml/1000 liters of drinking water) | Carrier + fermentation (500 g/1000 kg finished feed) and fermentation (250 ml/1000 liters of drinking water) |
|---|---|---|---|
| 3.2857 b | 2.2857 ab | 2.1429 ab | 1.7143 a |
| — | 30.4% decrease | 34.8% decrease | 47.8% decrease |

TABLE 20

Mortality (%) day 0-49.

| Untreated Control Finished feed alone | Carrier + fermentation (500 g/1000 kg finished feed) | fermentation (250 ml/1000 liters of drinking water) | Carrier + fermentation (500 g/1000 kg finished feed) and fermentation (250 ml/1000 liters of drinking water) |
|---|---|---|---|
| 10.00 c | 6.60 ab | 6.20 ab | 4.80 a |
| — | 34.0% decrease | 38.0% decrease | 52.0% decrease |

Thus, embodiments of the present disclosure (e.g., compositions or components thereof) can be added to the animal's food and/or water supply. Each additive was dissolved in a suitable amount of water and mixed with the water supplied to each group. Beneficial results were similarly observed in the supplemented water group. Another group was administered the various additives in both the water supply and feed, as described above. Further beneficial results were observed in the supplemented water and feed group.

Embodiments of the present disclosure are also useful for supplying nutrition and/or enhancing the health of other animals, as described herein. For example, other varieties of chicken and/or birds received similar and/or additional health benefits from consuming compositions of the present disclosure. In addition, mammals and other animals of the varieties described herein received similar and/or additional health benefits from consuming compositions of the present disclosure. Economically-important animals, in particular, whether for consumption, production of animal by-product, performance, companionship, etc., received similar and/or additional health benefits from consuming compositions of the present disclosure.

While human animals were not treated with compositions of the present disclosure, it is anticipated that humans would receive similar and/or additional health benefits from consuming compositions of the present disclosure.

It is further noted that some embodiments of the present disclosure are substantially devoid of live and/or viable microorganisms (e.g., from the fermentation product or culture). Accordingly, embodiments of the present disclosure can be safe for consumption by all human and non-human animals.

In another experiment, the effect of the composition (i.e., the microbial fermentation product-bound carrier) on the incidence of fungal (e.g., mold) growth in antibiotic-free, corn-soy based poultry feed prepared in conformance with commercial standards was investigated. The basal starter and grower mash broiler diets were manufactured using commercial blending equipment and stored by independent research facility in a bulk form. The basal feeds were divided in half with one-half being stored and used as a control and the other half treated with the composition at a rate of 1 kg of the composition per 1000 kg of feed.

Six feeds were evaluated: 1) basal starter, 2) basal grower, 3) control starter, 4) control grower, 5) treated starter and 6) treated grower. Twelve replications, each containing one gram (±5%) of feed placed into 75 mm sterile petri dish, were prepared for each of the six tested feeds. Care was taken to avoid cross-contamination between different feeds. All prepared feed samples were incubated for 22 weeks at 30° C. and 65%±5% relative humidity (RH). Visual observations of mold growth were conducted every two weeks.

Fungal growth was observed as early as 8 weeks of incubation (in control starter feed). The incidence of fungal growth increased with time of incubation in four out of six tested feeds: basal starter, basal grower, control starter and control grower. Feeds treated with microbial fermentation product-bound carrier, whether starter feed or grower feed, surprisingly and unexpectedly did not show any incidences of fungal growth throughout the duration of the experiment. Experimental data is presented in Table 21.

TABLE 21

Fungal growth incidence.

| Incubation time (weeks) | Fungal growth incidence in different feeds (%) | | | | | |
|---|---|---|---|---|---|---|
| | Basal starter | Basal grower | Control starter | Control grower | Cytozyme treated starter | Cytozyme treated grower |
| 2 | 0 | 0 | 0 | 0 | 0 | 0 |
| 4 | 0 | 0 | 0 | 0 | 0 | 0 |
| 6 | 0 | 0 | 0 | 0 | 0 | 0 |
| 8 | 0 | 0 | 8 | 0 | 0 | 0 |
| 10 | 0 | 0 | 17 | 0 | 0 | 0 |
| 12 | 17 | 0 | 17 | 0 | 0 | 0 |
| 14 | 33 | 8 | 17 | 0 | 0 | 0 |
| 16 | 33 | 8 | 17 | 33 | 0 | 0 |
| 18 | 42 | 8 | 17 | 33 | 0 | 0 |
| 20 | 42 | 25 | 33 | 33 | 0 | 0 |
| 22 | 42 | 25 | 33 | 33 | 0 | 0 |

Thus, embodiments of this disclosure (e.g., microbial fermentation product-bound carrier) can possesses and/or exhibits antifungal and/or fungal growth-inhibiting activity when mixed with animal feed, on which fungus normally grows. As used herein, "antifungal," "antifungal activity," "antifungal effect," and similar terms refers to (1) protection against contamination (e.g., inoculation, infection, etc.) with or by one or more fungi (e.g., fungal resistance activity), and/or (2) inhibition (e.g., reduction, attenuation, prevention, etc.) of fungal growth (e.g., fungistatic activity), and/or (3) killing of fungi (e.g., fungicidal activity). The protection against and/or inhibition of fungal contamination and/or growth and/or killing of fungi by embodiments of this disclosure is an additional benefit of embodiments of the present disclosure. This feature (alone) provides a significant advantage in the art, as animal feed spoiling results in large economic loss to feed manufactures of all types. For instance, the protection against and/or inhibition of fungal contamination and/or growth by embodiments of this disclosure can (help or contribute to) increase animal weight gain and/or feed conversion ratios, decrease mortality, etc. Coupled with other beneficial consumption-related outcomes (as described herein), embodiments of the present disclosure provide a unique and previously unknown beneficial product and treatment method for enhancing the health and wellness of animals, while reducing or inhibiting loss of animal feed to fungal growth.

In addition to the foregoing, embodiments of this disclosure can exhibit other antimicrobial activity, such as anti-bacterial (e.g., protection against and/or inhibition of bacterial contamination and/or growth), antiviral (e.g., protection against and/or inhibition of viral contamination and/or growth), and so forth.

CONCLUSION

While the foregoing detailed description makes reference to specific exemplary embodiments, the present disclosure may be embodied in other specific forms without departing from its spirit or essential characteristics. Accordingly, the described embodiments are to be considered in all respects only as illustrative and not restrictive. For instance, various substitutions, alterations, and/or modifications of the inventive features described and/or illustrated herein, and additional applications of the principles described and/or illustrated herein, which would occur to one skilled in the relevant art and having possession of this disclosure, can be made to the described and/or illustrated embodiments without departing from the spirit and scope of the invention as defined by the appended claims. Such substitutions, alterations, and/or modifications are to be considered within the scope of this disclosure.

The scope of the invention is, therefore, indicated by the appended claims rather than by the foregoing description. The limitations recited in the claims are to be interpreted broadly based on the language employed in the claims and not limited to specific examples described in the foregoing detailed description, which examples are to be construed as non-exclusive and non-exhaustive. All changes which come within the meaning and range of equivalency of the claims are to be embraced within their scope.

It will also be appreciated that various features of certain embodiments can be compatible with, combined with, included in, and/or incorporated into other embodiments of the present disclosure. For instance, systems, methods, and/or products according to certain embodiments of the present disclosure may include, incorporate, or otherwise comprise features described in other embodiments disclosed and/or described herein. Thus, disclosure of certain features relative to a specific embodiment of the present disclosure should not be construed as limiting application or inclusion of said features to the specific embodiment. In particular, ingredients and components disclosed in the present application are intended to be independently added or removed from embodiments of the present disclosure, without regard to any example, listing, series, or combination in which they are disclosed. Similarly, method steps disclosed in the present application are intended to be independently added or removed from embodiments of the present disclosure, without regard to any example, listing, series, or combination in which they are disclosed.

Likewise, any steps recited in any method or process described herein and/or recited in the claims can be executed in any suitable order and are not necessarily limited to the order described and/or recited, unless otherwise stated (explicitly or implicitly). Such steps can, however, also be required to be performed in a specific order or any suitable order in certain embodiments of the present disclosure.

In addition, unless a feature is described as being requiring in a particular embodiment, features described in the various embodiments can be optional and may not be included in other embodiments of the present disclosure. Moreover, unless a feature is described as requiring another feature in combination therewith, any feature herein may be combined with any other feature of a same or different embodiment disclosed herein. It will be appreciated that while features may be optional in certain embodiments, when features are included in such embodiments, they can be required to have a specific configuration as described in the present disclosure.

It is noted that at least some of the statements made throughout this disclosure have not been evaluated by the U.S. Food and Drug Administration (FDA). Accordingly, certain embodiments of this disclosure are not intended to diagnose, treat, cure, or prevent any disease.

Furthermore, various well-known aspects of illustrative systems, methods, products, and the like are not described herein in particular detail in order to avoid obscuring aspects of the example embodiments. Such aspects are, however, also contemplated herein.

I claim:

1. An animal nutrient composition, comprising:
    a combination product having a moisture content between about 0.25% and about 5% by weight, the combination product comprising:
        a solid carrier comprising one or more phyllosilicates; and
        a microbial fermentation product adsorbed to a surface of the solid carrier and/or absorbed below the surface of the solid carrier, the microbial fermentation product comprising:
            lysed cells or cellular components thereof;
            a liquid fermentation medium; and
            cellular metabolites produced anaerobically.

2. The composition of claim 1, wherein the one or more phyllosilicates are selected from the group consisting of 1:1 clay mineral phyllosilicates, 2:1 clay mineral phyllosilicates, aliettite, attapulgite, bentonite, chlorite, dickite, halloysite, hectorite, illite, kaolinite, montmorillonite, nacrite, nontronite, palygorskite, saponite, sauconite, sepiolite, serpentine, talc, vermiculite, and combinations thereof.

3. The composition of claim 1, wherein the solid carrier has a particle size or an average particle size between about 20-297 μm.

4. The composition of claim 1, wherein the lysed cells are lysed single-celled microorganisms.

5. The composition of claim 1, wherein less than about 10%, by weight, of biomass in the microbial fermentation product is living or viable microorganisms.

6. The composition of claim 1, further comprising a buffering agent mixed with the combination product, the buffering agent comprising one or more electrolytic substances selected from the group consisting of sodium sesquicarbonate, sodium carbonate, and sodium bicarbonate.

7. The composition of claim 1 further comprising granular or powdered sodium sesquicarbonate mixed with the combination product.

8. The composition of claim 1 further comprising an animal feed component mixed or admixed with the combination product, the animal feed component comprising solid chicken feed.

9. The composition of claim 1, wherein the combination product has a moisture content between about 0.25% and about 2% by weight.

10. A method of manufacturing the composition of claim 1, comprising:
    applying the microbial fermentation product in liquid form directly to the solid carrier such that the fermentation product binds to the carrier by adsorption of the fermentation product to a surface of the solid carrier and/or by absorption of the fermentation product below the surface of the solid carrier; and
    allowing the solid carrier with fermentation product applied thereto to at least partially dry, thereby producing the combination product having a moisture content between about 0.25% and about 5% by weight.

11. The method of claim 10, further comprising one or more steps selected from the group consisting of:
    cultivating a microbial fermentation culture for a first period of time, the microbial fermentation culture comprising the liquid fermentation medium, microorganisms, and metabolites produced anaerobically by the microorganisms, the microorganisms undergoing anaerobic metabolism or cellular respiration during the first period of time; and
    lysing at least some of the microorganisms in the microbial fermentation culture to produce the lysed cells or cellular components thereof.

12. The method of claim 11, wherein, following the step of lysing at least some of the microorganisms, less than about 10% of the microorganisms of the microbial fermentation culture are living or viable.

13. The method of claim 11, further comprising one or more steps selected from the group consisting of:
mixing the solid carrier while applying the microbial fermentation product thereto; and
applying a flow of air to the solid carrier:
(i) while applying the microbial fermentation product thereto and/or after applying the fermentation product thereto, and/or
(ii) over a period of time between about 12-120 hours and/or until the combination product has a moisture content between about 0.25% and about 5%, by weight.

14. A method of enhancing the health of a chicken, comprising administering an effective amount of the composition of claim 1 to the chicken so as to improve one or more health indicators of the chicken, the one or more health indicators selected from the group consisting of:
gut lesion formation;
gut bacteria count;
weight gain;
feed conversion ratio; and
life span.

15. A method of inhibiting fungal growth on an animal feed product, comprising:
mixing or admixing the animal feed product with the composition of claim 1, the animal feed product comprising solid chicken feed, wherein the composition inhibits fungal growth on the chicken feed.

16. The composition of claim 1, wherein the combination product comprises the microbial fermentation product bound to the solid carrier at a ratio of approximately 1:1 by weight to approximately 1:20 by weight, microbial fermentation product to solid carrier, or at a ratio of approximately 1:1 by weight to approximately 1:20 by weight, solid carrier to microbial fermentation product.

17. The composition of claim 1, wherein the combination product comprises the microbial fermentation product bound to the solid carrier at a ratio of approximately 1:1 by weight, microbial fermentation product to solid carrier.

18. The composition of claim 6, further comprising an animal feed component mixed or admixed with the combination product and buffering agent, the animal feed component comprising chicken feed.

19. The composition of claim 6, wherein the composition has a moisture content between about 0.25% and about 2% by weight.

20. The composition of claim 7, further comprising an animal feed component mixed or admixed with the combination product and sodium sesquicarbonate, the animal feed component comprising chicken feed.

21. The composition of claim 7, wherein the sodium sesquicarbonate is mixed with the combination product at a ratio between about 1:1 and about 1:20, fermentation product-bound carrier to buffering agent, or at a ratio between about 1:1 and about 1:20, buffering agent to fermentation product-bound carrier.

22. The composition of claim 7, wherein the sodium sesquicarbonate is mixed with the combination product at a ratio between about 1:4 and about 1:8, fermentation product-bound carrier to buffering agent.

23. The method of claim 10, further comprising mixing a buffering agent with the combination product, the buffering agent comprising one or more electrolytic substances selected from the group consisting of sodium sesquicarbonate, sodium carbonate, and sodium bicarbonate, the buffering agent having a moisture content between about 0.25% and about 20% by weight.

24. The method of claim 23, further comprising mixing an animal feed product with the mixture of the combination product and the buffering agent, the animal feed product comprising chicken feed.

25. The method of claim 24, wherein the animal feed product has a moisture content between about 0.25% and about 20% by weight.

26. The method of claim 10, further comprising mixing granular or powdered sodium sesquicarbonate with the combination product, the granular or powdered sodium sesquicarbonate having a moisture content between about 0.25% and about 20% by weight.

27. The method of claim 26, further comprising mixing an animal feed product with the mixture of the combination product and sodium sesquicarbonate, the animal feed product comprising chicken feed.

28. The method of claim 27, wherein the animal feed product has a moisture content between about 0.25% and about 20% by weight.

29. The method of claim 13, further comprising one or more steps selected from the group consisting of:
maintaining the carrier with the fermentation product applied thereto at a temperature below about 60° C. for a first period of time; and
maintaining the carrier with the fermentation product applied thereto at a pH between about 2-10.

30. An animal nutrient composition, comprising:
a combination product having a moisture content between about 0.25% and about 5% by weight, the combination product comprising:
a solid carrier comprising one or more phyllosilicates; and
a microbial fermentation product adsorbed to a surface of the solid carrier and/or absorbed below the surface of the solid carrier, the microbial fermentation product comprising:
a liquid fermentation medium;
anaerobically produced metabolites; and
lysed *Lactobacillus* bacteria or cellular components thereof; and
a granular or powdered buffering agent mixed with the combination product, the buffering agent comprising one or more compounds selected from the group consisting of sodium sesquicarbonate, sodium carbonate, and sodium bicarbonate, the buffering agent having a moisture content between about 0.25% and about 20% by weight.

31. The composition of claim 4, wherein the microorganisms include *Lactobacillus acidophilus* and optionally one or more additional microbial species or strains.

32. The method of claim 10, further comprising mixing an animal feed product with the combination product, the animal feed product comprising chicken feed.

33. The composition of claim 1, further comprising aerobically produced metabolites or cellular metabolites produced aerobically.

34. A composition, comprising a combination product having a moisture content between about 0.25% and about 5% by weight, the combination product comprising:
a solid carrier comprising one or more phyllosilicates; and
a microbial fermentation product adsorbed to a surface of the solid carrier and/or absorbed below the surface of the solid carrier, the microbial fermentation product comprising:
a liquid fermentation medium;
anaerobically produced metabolites; and
lysed cells or cellular components thereof.

* * * * *